(12) United States Patent
Tanaka et al.

(10) Patent No.: US 9,110,319 B2
(45) Date of Patent: Aug. 18, 2015

(54) LIQUID CRYSTAL DISPLAY

(71) Applicants: Yukio Tanaka, Kanazawa (JP); Kenji Nakao, Kanazawa (JP); Daiichi Suzuki, Nonoichi (JP)

(72) Inventors: Yukio Tanaka, Kanazawa (JP); Kenji Nakao, Kanazawa (JP); Daiichi Suzuki, Nonoichi (JP)

(73) Assignee: Japan Display Inc., Tokyo (JP)

( * ) Notice: Subject to any disclaimer, the term of this patent is extended or adjusted under 35 U.S.C. 154(b) by 267 days.

(21) Appl. No.: 13/789,925

(22) Filed: Mar. 8, 2013

(65) Prior Publication Data

US 2013/0258223 A1    Oct. 3, 2013

(30) Foreign Application Priority Data

Mar. 28, 2012 (JP) ................. 2012-074671

(51) Int. Cl.
*G02F 1/1362* (2006.01)
*G02F 1/133* (2006.01)
*G09G 3/36* (2006.01)

(52) U.S. Cl.
CPC ...... *G02F 1/13306* (2013.01); *G02F 1/136213* (2013.01); *G02F 1/136227* (2013.01); *G09G 3/3655* (2013.01); *G09G 3/3614* (2013.01); *G09G 2300/0876* (2013.01)

(58) Field of Classification Search
CPC .......... G02F 1/136213; G02F 1/13306; G02F 1/136227
USPC ............................... 349/37, 39, 43
See application file for complete search history.

(56) References Cited

U.S. PATENT DOCUMENTS

| 6,259,494 | B1 * | 7/2001 | Kawai et al. | 349/39 |
|---|---|---|---|---|
| 8,144,279 | B2 * | 3/2012 | Tsubata | 349/43 |
| 8,217,872 | B2 * | 7/2012 | Itoh et al. | 345/87 |
| 2006/0274011 | A1 * | 12/2006 | Igarashi et al. | 345/94 |
| 2010/0231493 | A1 * | 9/2010 | Kaise et al. | 345/87 |
| 2010/0245697 | A1 * | 9/2010 | Shiiba et al. | 349/39 |

FOREIGN PATENT DOCUMENTS

JP    2010-230842    10/2010

OTHER PUBLICATIONS

U.S. Appl. No. 13/668,642, filed Nov. 5, 2012, Yukio Tanaka, et al.
U.S. Appl. No. 13/429,898, filed Mar. 26, 2012, Yukio Tanaka, et al.

* cited by examiner

*Primary Examiner* — Michael Caley
*Assistant Examiner* — Jia Pan
(74) *Attorney, Agent, or Firm* — Oblon, McClelland, Maier & Neustadt, L.L.P.

(57) ABSTRACT

According to one embodiment, an apparatus includes an array substrate including gate lines and auxiliary capacitance lines extending along a row, signal lines extending along a column, a semiconductor that intersects the gate line via an insulating layer and confronts the auxiliary capacitance line, a contact electrode for electrically connecting the semiconductor to the pixel electrode, a counter substrate, and a liquid crystal layer sandwiched between the substrates. In the pixels disposed side by side in a direction where the gate line extends, the positions of center of gravity of openings surrounded by the gate lines, the signal lines, the auxiliary capacitance line, and ends of the contact electrode are the same in a direction where the signal line extends.

4 Claims, 15 Drawing Sheets

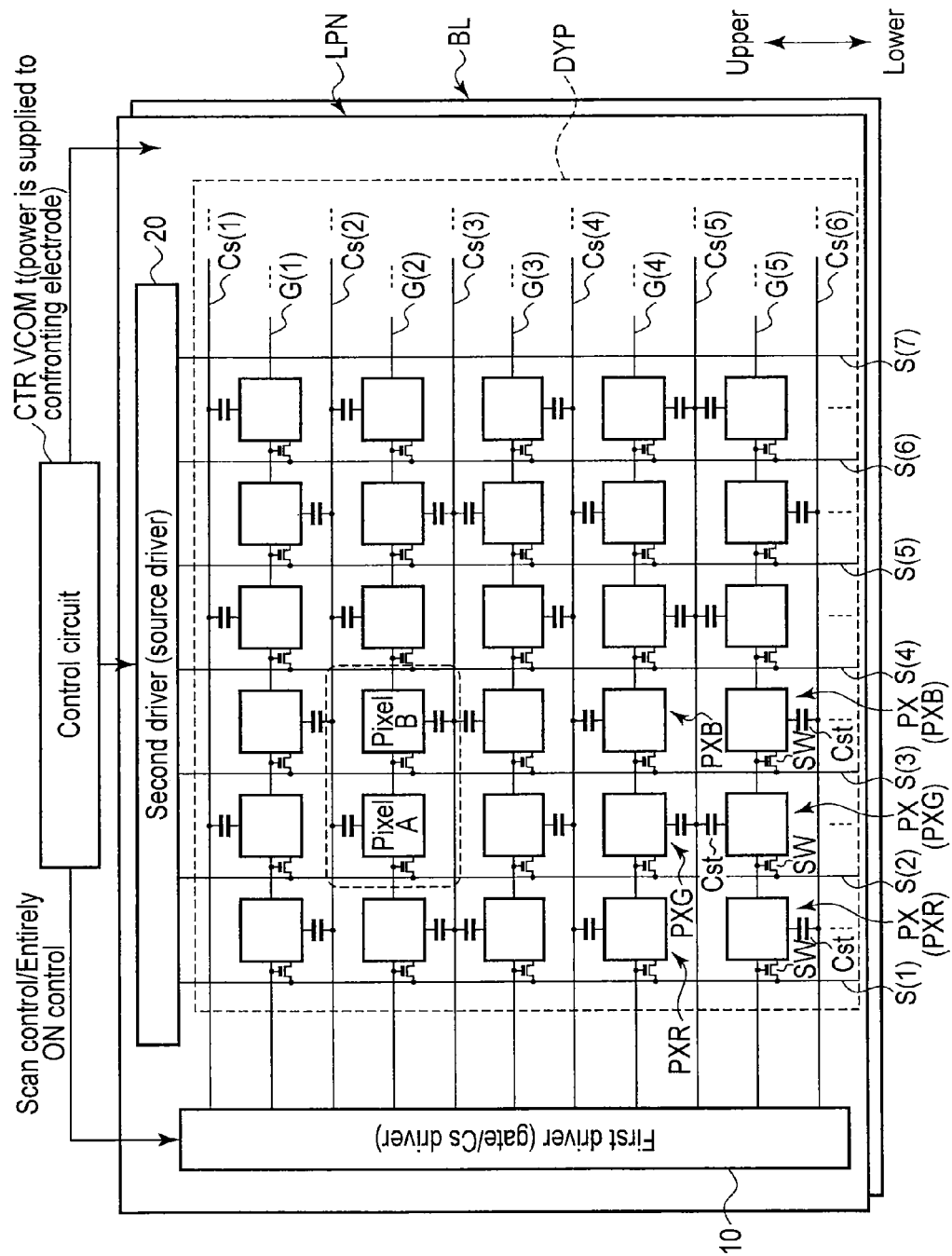
F I G. 1

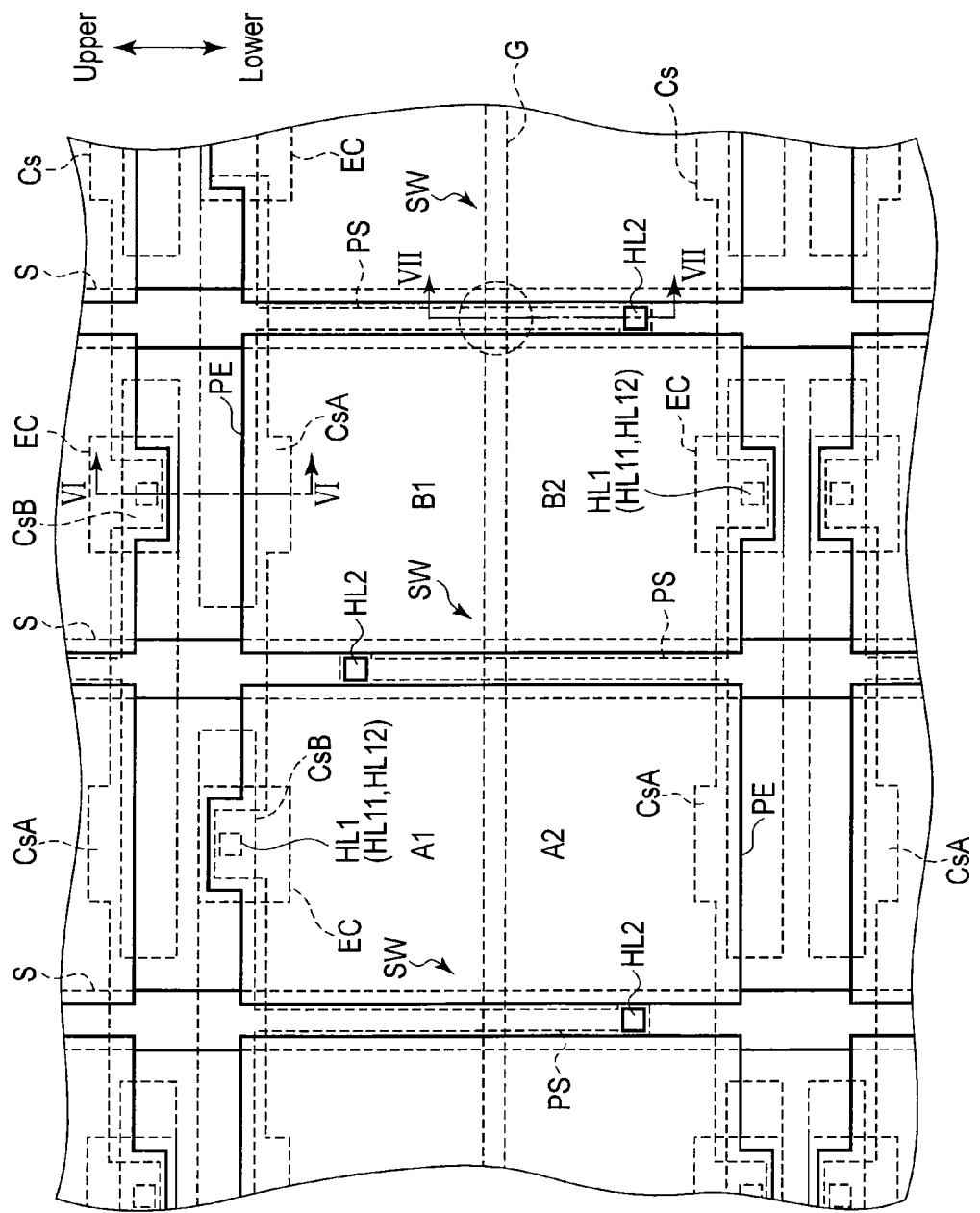
F I G. 5

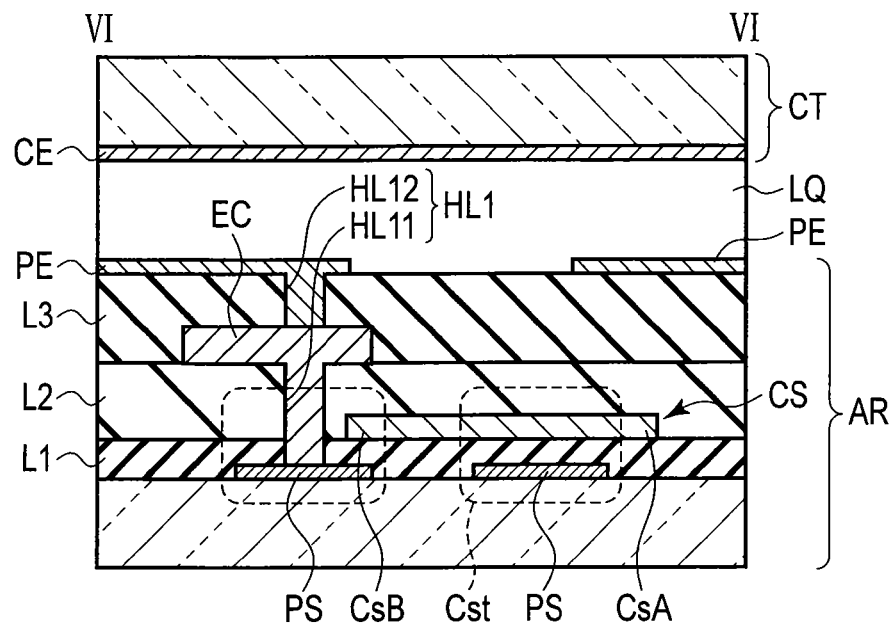
F I G. 6
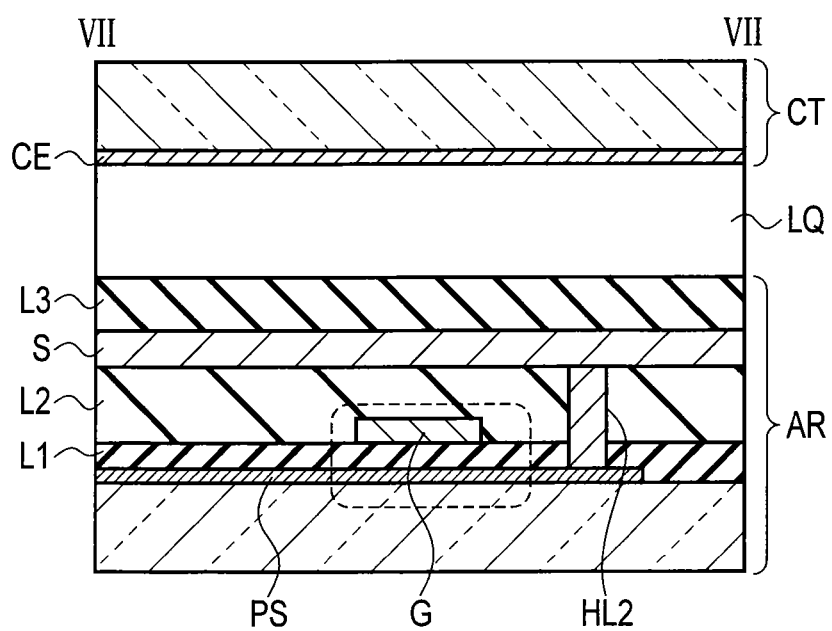
F I G. 7

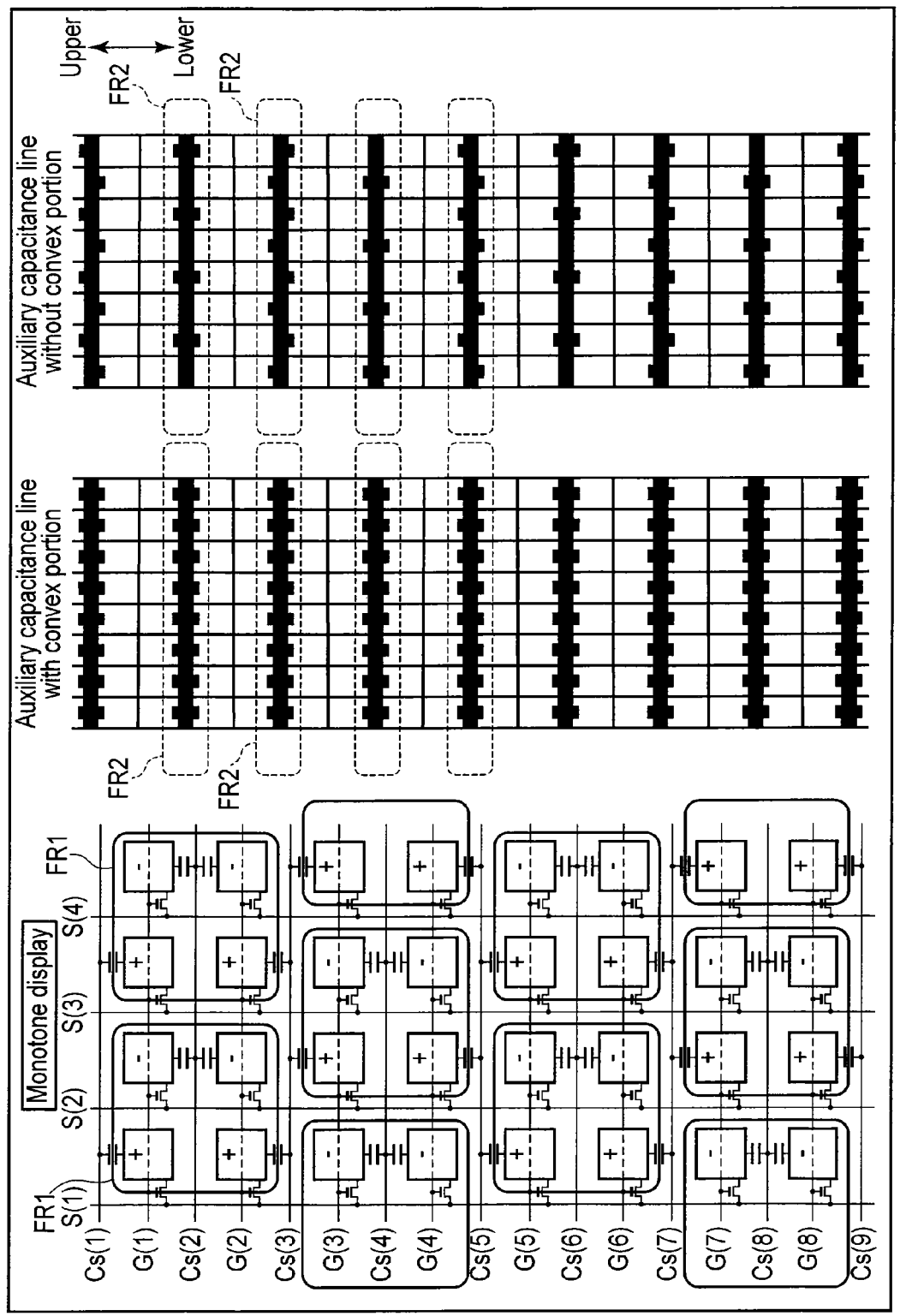
F I G. 8

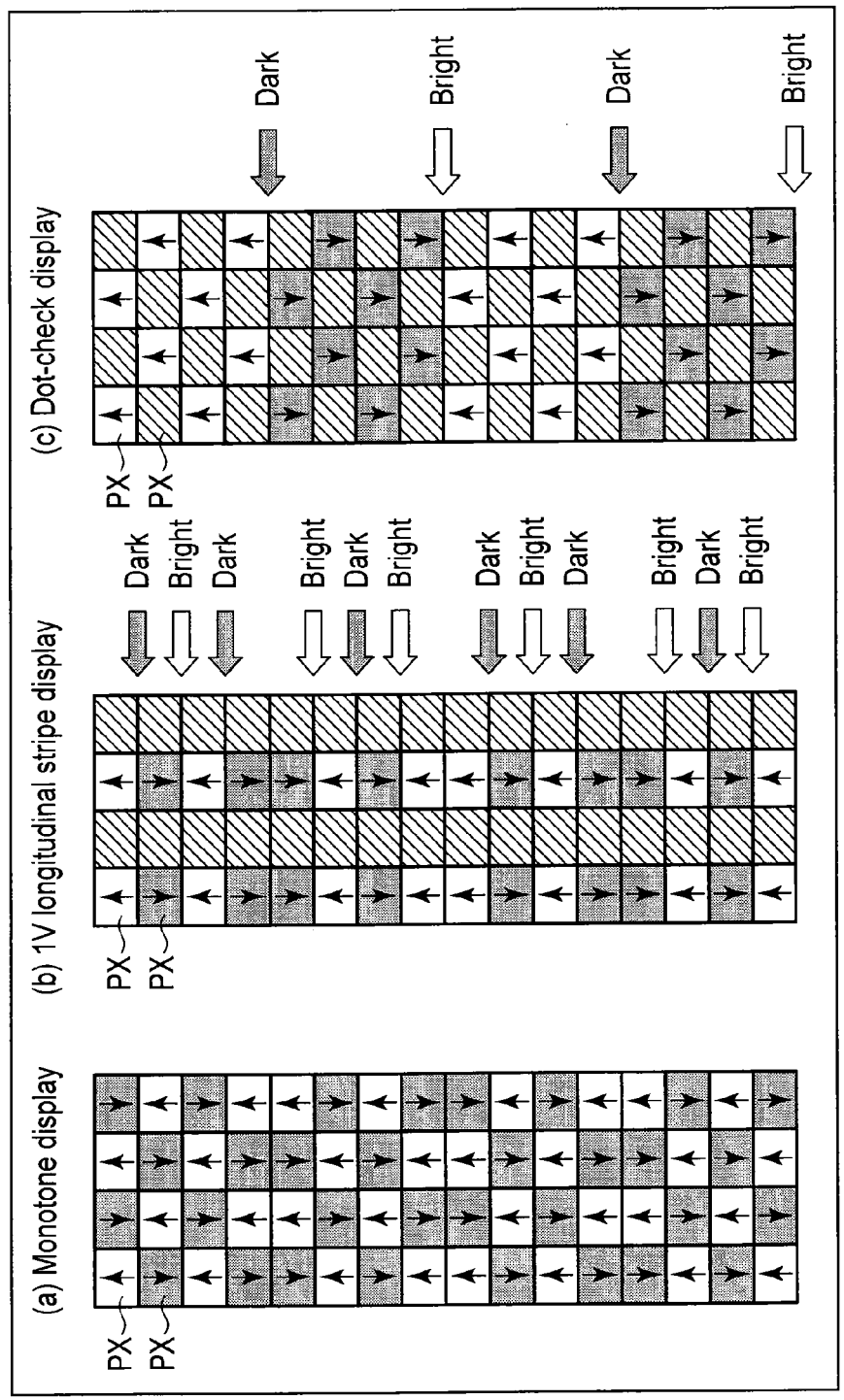
F I G. 14

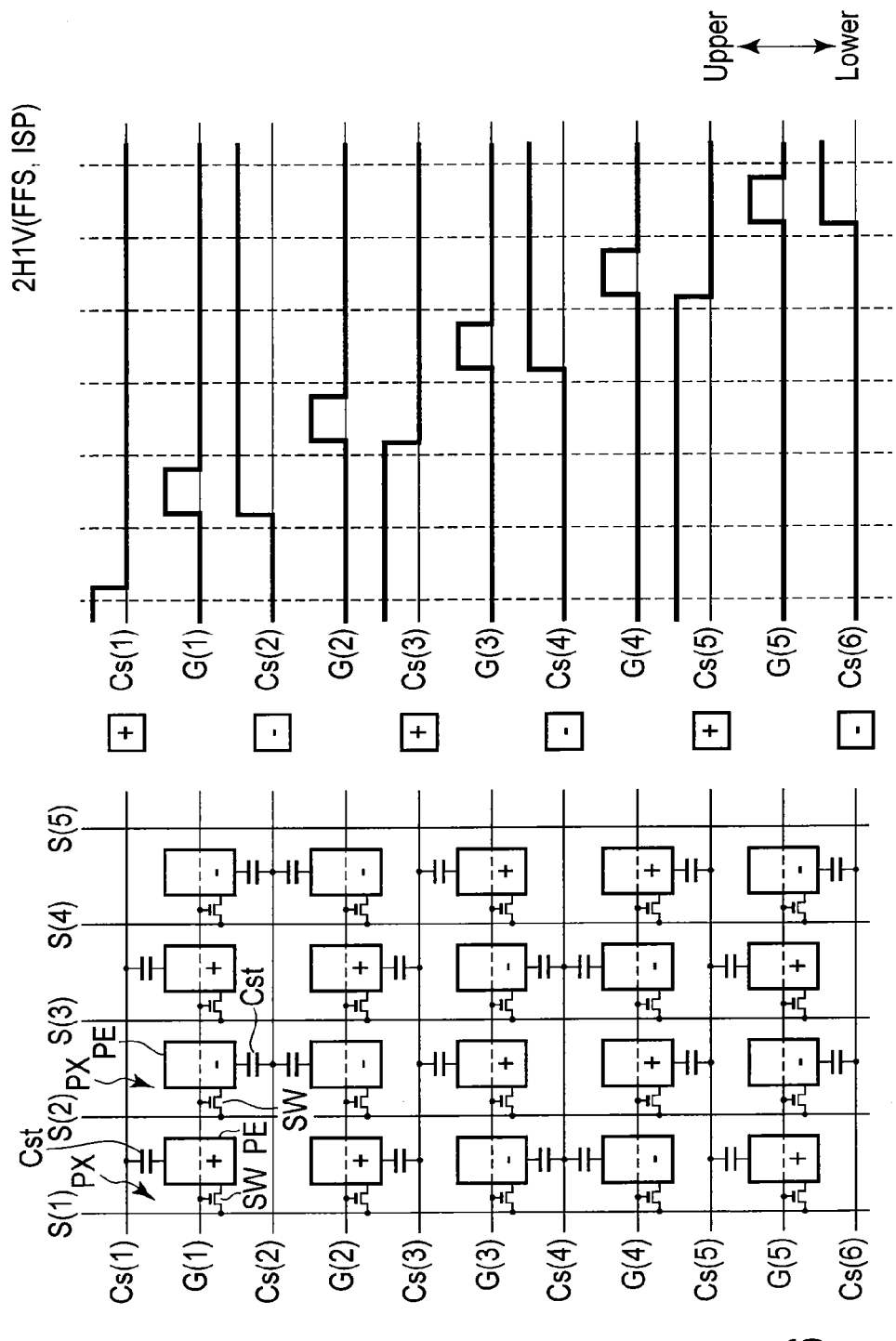
F I G. 16

LIQUID CRYSTAL DISPLAY

CROSS-REFERENCE TO RELATED APPLICATIONS

This application is based upon and claims the benefit of priority from Japanese Patent Application No. 2012-074671, filed Mar. 28, 2012, the entire contents of which are incorporated herein by reference.

FIELD

Embodiments described herein relate generally to a liquid crystal display.

BACKGROUND

A liquid crystal display apparatus includes a pair of substrates, a liquid crystal layer sandwiched between the pair of substrates, and a display region having plural display pixels.

Further, in a liquid crystal display apparatus, as a countermeasure against flicker, there is proposed executing an alternating electric field drive by inverting the polarity of a liquid crystal application voltage every other scan line or every scan line. As a polarity inversion drive system, there are proposed polarity inversion (line inversion) executed every other scan line (row), polarity inversion (column inversion) executed every other signal line (column), dot inversion drive in which polarity is inverted both every other scan line and every other signal line, and the like.

In contrast, as a method of reducing a signal voltage amplitude, there is proposed a capacitively-coupled (CC) drive. In the capacitively-coupled drive, a predetermined voltage is reached by superimposing an auxiliary capacitance signal to a pixel electrode via an auxiliary capacitance. When the capacitively-coupled drive is employed, the signal voltage amplitude can be made to approximately half its original amplitude at the time, for example, the auxiliary capacitance is made approximately the same as a pixel capacitance.

BRIEF DESCRIPTION OF THE DRAWINGS

FIG. 1 is a view schematically illustrating a configuration example of a liquid crystal display apparatus of an embodiment;

FIG. 5 is a view illustrating an example of a pixel layout of the liquid crystal display apparatus of the first embodiment;

FIG. 6 is a view illustrating an example of a sectional structure of a liquid crystal display panel taken along line VI-VI in FIG. 5;

FIG. 7 is a view illustrating an example of a sectional structure of a liquid crystal display panel taken along line VII-VII in FIG. 5;

FIG. 8 is a view illustrating an example of a display pattern when a monotone display is executed in a liquid crystal display apparatus employing a 2H1V-CCDI drive system;

FIG. 14 is a view illustrating an offset of center of gravity of an opening of a pixel as to the respective display patterns in the liquid crystal display apparatus employing the 4H1V-CCDI drive;

FIG. 16 is a view illustrating other configuration example of an auxiliary capacitance of a pixel in the liquid crystal display apparatus employing the 2H1V-CCDI drive method and other example of the drive waveform.

DETAILED DESCRIPTION

Figure 2:
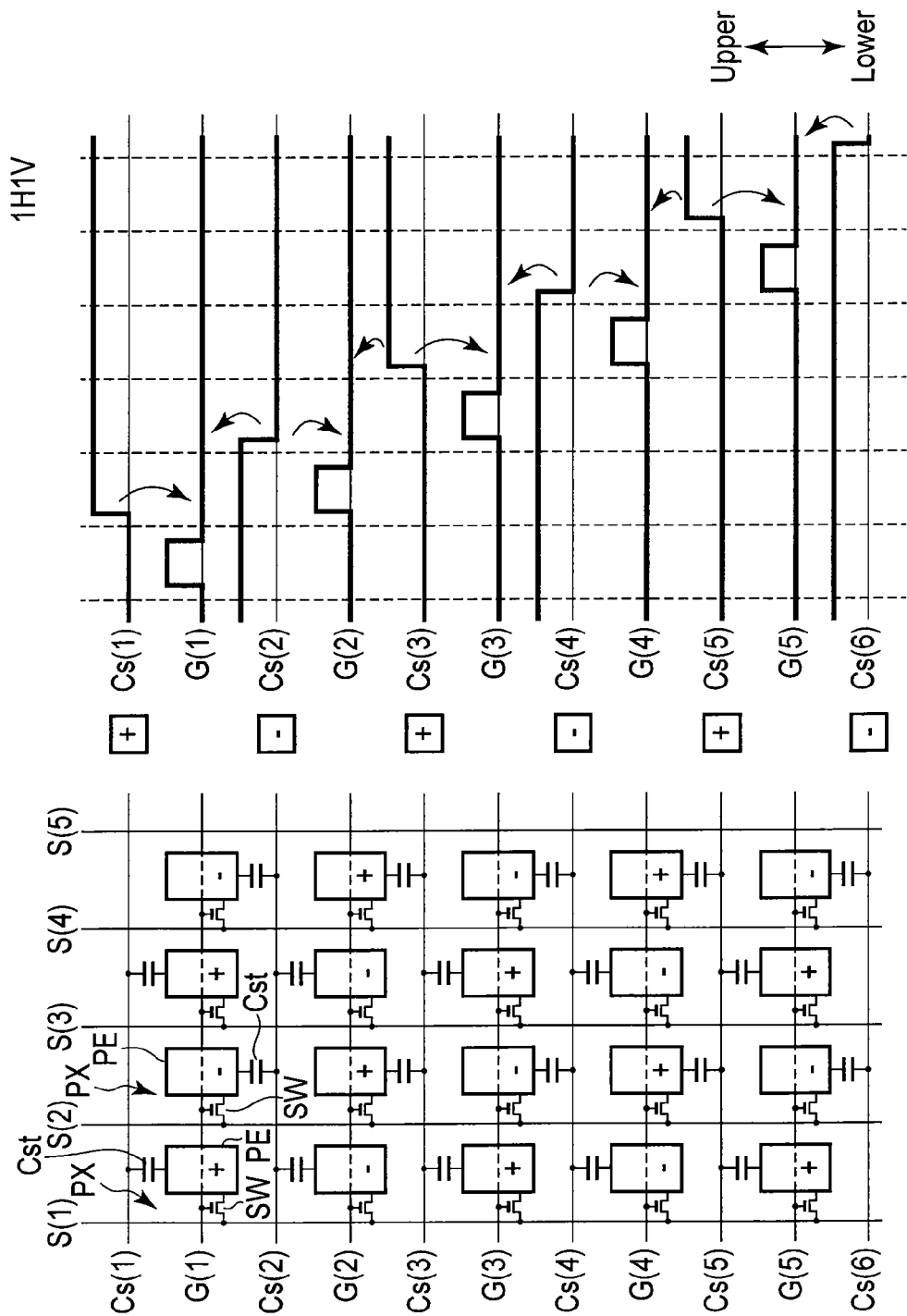
FIG. 2 is a view illustrating a configuration example of an auxiliary capacitance of a pixel in a liquid crystal display apparatus employing a 1H1V-CCDI drive method and an example of a drive waveform.

In general, according to one embodiment, a liquid crystal display apparatus comprises: An array substrate comprising a pixel electrode disposed to each of display pixels disposed in a matrix state, a gate line and an auxiliary capacitance line extending along a row along which the pixel electrode is arranged, a signal line extending along a column along which the pixel electrode is arranged, a semiconductor layer that intersects the gate line via an insulating layer and confronts the auxiliary capacitance line, a contact electrode interposed between the semiconductor layer and the pixel electrode for electrically connecting the semiconductor layer to the pixel electrode, and a drive circuit for driving the gate line, the signal line, and the auxiliary capacitance line; a counter substrate disposed in confrontation with the array substrate; and a liquid crystal layer sandwiched between the array substrate and the counter substrate. In the display pixels disposed side by side in a direction where the gate line extends, the positions of center of gravity of openings surrounded by the gate line, the signal line, the auxiliary capacitance line, and ends of the contact electrode are the same in a direction where the signal line extends.

The liquid crystal display apparatus according to the embodiment will be explained below in detail referring to drawings.

In the embodiment, a capacitively-coupled dot inversion (CCDI) drive is employed as a drive method of the liquid crystal display apparatus. The embodiment employs a capacitively-coupled dot inversion drive (nH1V-CCDI drive) in which, in particular, n is set to an integer of 1 or more and polarity is inverted every n scan lines and polarity is inverted every other signal line in the CCDI drive. The capacitively-coupled (CC) drive obtains amplitude increase effect by applying a superimposed voltage by a capacitively-coupled coupling to a pixel potential after writing has been executed from a signal line S to a pixel.

FIG. 1 is a view schematically illustrating a configuration example the liquid crystal display apparatus of the embodiment. Note that FIG. 1 illustrates a configuration of a liquid crystal display apparatus employing a 2H1V-CCDI drive system as an example.

The liquid crystal display apparatus according to the embodiment includes a liquid crystal display panel LPN having a display unit DYP including plural display pixels PX, a backlight BL disposed to illuminate the display unit DYP of the liquid crystal display panel LPN, and a control circuit CTR for controlling the liquid crystal display panel LPN and backlight BL.

The liquid crystal display panel LPN has a pair of substrates, that is, an array substrate AR (FIG. 6 and FIG. 7) and a counter substrate CT (FIG. 6 and FIG. 7), and a liquid crystal layer LQ (FIG. 6 and FIG. 7) sandwiched between the array substrate AR and the counter substrate CT.

The liquid crystal display apparatus according to the embodiment is a color display type liquid crystal display apparatus and the plural display pixels PX include plural color display pixels. The liquid crystal display apparatus illustrated in FIG. 1 include red color display pixels PXR for displaying red color, green display pixels PXG for displaying green color, and blue color display pixels PXB for displaying blue color. The respective color display pixels are disposed side by side approximately parallel to a direction where the signal line S extends.

The array substrate AR has a transparent insulating substrate, for example, a glass and the like. On the transparent insulating substrate, pixel electrodes PE are disposed in the respective display pixels PX. Further, the array substrate AR has plural gate lines G(G(1)-G(M)) disposed along a row along which the plural pixel electrodes PE are disposed, plural signal lines S(S(1)-S(N)) extending along a column along which the plural pixel electrodes PE are arranged between the plural pixel electrodes PE, auxiliary capacitance lines Cs(Cs(1)-Cs(M+1)) extending approximately parallel to the gate lines G, and plural pixel switches SW disposed in the vicinity of the positions at which the gate lines G intersect the signal lines S.

Each of the pixel switches SW includes a thin-film transistor (TFT) as, for example, a switching element. The gate of the pixel switch SW is electrically connected to a gate line G (or formed integrally therewith). The source of the pixel switch SW is electrically connected to a signal line S (or formed integrally therewith). The drain of the pixel switch SW is electrically connected to a pixel electrode PE (or formed integrally therewith). That is, the source-drain path of the pixel switch SW is connected between the signal line S and a pixel electrode PE. When the respective pixel switches SW are driven via corresponding gate lines G, respectively, the respective pixel switches SW are conducted between corresponding signal lines S and corresponding pixel electrodes PE.

The liquid crystal display panel LPN includes a first driver (gate/Cs driver) 10 for sequentially driving the plural gate lines G(1)-G(M) to conduct the plural pixel switches SW in, for example, a row unit and driving also the plural auxiliary capacitance lines Cs(1)-Cs(M+1), and a second driver (source driver) 20 for outputting a video signal or a non-video signal to the plural signal lines S(1)-S(N), respectively during a period in which the pixel switches SW of the respective rows are conducted by driving the corresponding gate lines G.

The first driver 10 and the second driver 20 are drive units for driving the gate lines G, the signal lines S, and the auxiliary capacitance lines Cs.

The first driver 10 and the second driver 20 may be made including an externally mounted IC or may be formed on the array substrate AR as a built-in circuit. In the liquid crystal display apparatus according to the embodiment, the first driver 10 and the second driver 20 are disposed in the periphery of the display unit DYP and controlled by the control circuit CTR.

Note that, in FIG. 1, although the first driver 10 is disposed on a left side of the display unit DYP to a sheet surface, the first driver 10 may be disposed on a right side depending on a case. Otherwise, two first drivers 10 having the same function may be symmetrically disposed on both the right and left sides. Otherwise, two first drivers 10 may be disposed on both the right and left sides by being separated to a driver having a function for driving the gate line and to a driver having a function for driving the auxiliary capacitance line Cs, respectively.

The counter substrate CT has a color filter (not illustrated) disposed on a transparent insulating substrate, for example, a glass and the like and including a color layer of red, green, blue, a common electrode (not illustrated) disposed on the color filter in confrontation with the plural pixel electrodes PE, and the like.

The pixel electrodes PE and the common electrode CE are including a transparent electrode material, for example, ITO and the like and covered with a pair of orientation films (not illustrated) subjected to a rubbing process in a parallel direction each other, respectively. The respective pixel electrodes PE and the common electrode CE constitute the display pixels PX together with pixel regions that are a part the liquid crystal layer LQ controlled by a liquid crystal molecular arrangement corresponding to electric fields from the pixel electrodes PE and the common electrode CE.

The plural color display pixels are classified according to color of a colored layer disposed thereto. The red color display pixel includes a red colored layer. The green display pixel includes a green colored layer. The blue color display pixel includes a blue colored layer.

The plural display pixels PX have a liquid crystal capacitance (not illustrated) including the liquid crystal layer LQ held between the pixel electrode PE and the common electrode CE, respectively. The liquid crystal capacitance is determined by a dielectric constant of a liquid crystal material, an area of a pixel electrode, and a gap of a liquid crystal cell.

A voltage applied to a signal line S by the second driver 20 (hereinafter, called a source voltage) is applied the pixel electrode PE of the display pixels PX of a selected row by a corresponding pixel switch SW. A potential difference between a voltage (pixel potential) applied to a pixel electrode PE and a common voltage Vcom applied to a common electrode CE is held by the liquid crystal capacitance.

Further, an auxiliary capacitor Cst is configured by a part of the pixel electrode PE (or a semiconductor layer of a switching element) laminated via an insulating film and the auxiliary capacitance line Cs (Cs(1)-Cs(M+1)) disposed so as to extend approximately parallel to the gate line G. In a hold period after a signal has been written to the pixel electrode PE, the auxiliary capacitor Cst is coupled with the liquid crystal capacitance.

Note that, although there are a case that the auxiliary capacitor Cst is connected to an auxiliary capacitance line Cs on an upper side (on one side in the direction where the signal line S extends) with respect to the pixel electrode PE and a case that the auxiliary capacitor Cst is connected to an auxiliary capacitance line Cs on a lower side (the other side in the direction where the signal line S extends) with respect to the pixel electrode PE, auxiliary capacitance lines Cs output by the auxiliary capacitor Cst are appropriately distributed so that the loads of the auxiliary capacitance lines Cs are made roughly uniform in respective rows.

In an ordinary display operation, the control circuit CTR outputs a control signal generated based on a synchronization signal input from an external signal source to the first driver 10 and outputs the control signal generated based on the synchronization signal input from the external signal source and a video signal or a black inserting inversion-transition prevention signal input from an external signal source to the second driver 20. Further, the control circuit outputs the common voltage Vcom applied to the common electrode CE to the counter substrate CT.

Further, also in a transition drive which is executed prior to a display at the time of start-up after power has been supplied, the control circuit CTR outputs a control signal necessary to execute the transition drive to the first driver 10 and outputs a transition voltage signal to the second driver 20. Further, the control circuit CTR outputs a voltage waveform necessary to execute the transition drive also to the common electrode CE of the counter substrate CT. The transition drive will be described later in detail.

The control signal output from the control circuit CTR to the first driver 10 includes a start pulse signal and a clock signal for controlling the operation of a shift register of the first driver 10, a Cs polarity control signal for controlling the polarity of a superimposed voltage by the capacitively-coupled coupling, and the like.

Next, a drive method of a 1H1V-CCDI drive that is most fundamental in the nH1V-CCDI drive will be explained referring to drawings. This is a system employing a so-called 1H1V inversion in which the arrangement of a pixel polarity is inverted every other column and the arrangement of a pixel polarity is inverted every other row and is a drive method for arranging pixels having a positive polarity and pixels having a negative polarity are arranged in a checked pattern.

FIG. 2 is a view illustrating a configuration example of an auxiliary capacitance of a pixel in a liquid crystal display apparatus employing a 1H1V-CCDI drive method and an example of a drive waveform.

As an advantage of the 1H1V inversion, since positive and negative polarities mixedly exist at the time of writing to respective rows and since coupling from, for example, a signal line S to a common electrode CE are cancelled by the positive and negative polarities, lateral crosstalk can be improved. Further, when a dot inversion is employed, there is an advantage that even if a potential of a common electrode is offset, a line flicker is less viewed.

In the liquid crystal display apparatus for executing the nH1V-CCDI drive, the auxiliary capacitor Cst of the respective display pixels PX is connected to any of the auxiliary capacitance lines Cs on the upper side and the lower side of a pixel electrode PE to the sheet surface.

When the drive method of the 1H1V-CCDI drive is employed, a destination to which the auxiliary capacitor Cst of the display pixel PX of each column is connected is alternately different every other column. That is, for example, the auxiliary capacitor Cst of the display pixel PX that belongs to an odd number column is connected to an upper side auxiliary capacitance line Cs of the pixel electrode PE, and the auxiliary capacitor Cst of the display pixel PX that belongs to an even number column is connected to a lower side auxiliary capacitance line Cs of the pixel electrode PE. With the configuration, the polarities of signals supplied to the pixel electrodes PE of the destinations to which they are connected from the respective auxiliary capacitance lines Cs via the auxiliary capacitances Cst are unified. For example, the signals all of which have a negative polarity are supplied to the pixel electrodes PE of the destinations to which they are connected from an auxiliary capacitance line Cs2 via the auxiliary capacitor Cst, and the signals all of which have a positive polarity are supplied to the pixel electrodes PE of the destinations to which they are connected from an auxiliary capacitance line Cs3 via the auxiliary capacitor Cst.

This is the same as to the other auxiliary capacitance lines Cs, and, in general, the signals supplied to the pixel electrodes PE from an auxiliary capacitance line Csn (n is an odd number) via the auxiliary capacitor Cst have the positive polarity, and the signals supplied to the destination pixel electrodes PE from an auxiliary capacitance line Csn' (n is an even number) via the auxiliary capacitor Cst have the negative polarity. As described above, a desired superimposed voltage can be applied to the respective display pixels PX without conflict by unifying the polarities of the signals supplied to pixel electrodes PE of the destinations to which they are connected from the respective auxiliary capacitance lines Cs via the auxiliary capacitor Cst.

For example, during a period in which the first driver 10 selects a gate line G1, an auxiliary capacitance line Cs1 to which the auxiliary capacitor Cst of the display pixel PX, to which a video signal of a positive polarity is written, is connected is made to a low voltage state (L) in the display pixels PX that belong to the row driven by gate line G1. On the one hand, an auxiliary capacitance line Cs2 to which the auxiliary capacitor Cst of the display pixels PX, to which a video signal of a negative polarity is written, is connected is made to a high voltage state (H) in the display pixels PX that belong to the row driven by gate line G1.

After the finish of selection of gate line G1 by the first driver 10, a potential of auxiliary capacitance line Cs1 is transited from the low voltage state to the high voltage state, and a potential of auxiliary capacitance line Cs2 is transited from the high voltage state to the low voltage state. As a result, a positive superimposed voltage is applied to the display pixels PX, to which the video signal of the positive polarity is written, via the auxiliary capacitor Cst in the display pixels PX that belong to the row driven by gate line G1, and a negative superimposed voltage is applied to the display pixels PX, to which the video signal of the negative polarity is written, via the auxiliary capacitor Cst in the display pixels PX that belong to the row driven by gate line G1.

Next, an auxiliary capacitance line Cs3 to which the auxiliary capacitor Cst of the display pixel PX, to which the video signal of the positive polarity is written, is connected is made to a low voltage state in the display pixels PX that belong to the row driven by gate line G2. On the one hand, an auxiliary capacitance line Cs2 to which the auxiliary capacitor Cst of the display pixels PX, to which the video signal of the negative polarity is written, is connected is made to a high voltage state in the display pixels PX that belong to the row driven by gate line G2 during a period in which gate line G2 is selected.

After the finish of selection of gate line G2 by the first driver 10, a potential of auxiliary capacitance line Cs3 is transited from the low voltage state to the high voltage state, and the potential of auxiliary capacitance line Cs2 is transited from the high voltage state to the low voltage state. As a result, the positive superimposed voltage is applied to the display pixels PX, to which the video signal of the positive polarity is written, via the auxiliary capacitor Cst in the display pixels PX that belong to the row driven by gate line G2, and the negative superimposed voltage is applied to the display pixels PX, to which the video signal of the negative polarity is written, via the auxiliary capacitor Cst in the display pixels PX that belong to the row driven by gate line G2.

Hereinafter, this is the same as to gate lines G3, G4, . . . , and as to all the display pixels PX in the display unit DYP, the positive superimposed voltage is applied to the display pixels PX, to which the video signal of the positive polarity is written, via the auxiliary capacitor Cst, and the negative superimposed voltage is applied to the display pixels PX, to which the video signal of the negative polarity is written, via the auxiliary capacitor Cst.

Note that, in the above explanation, although auxiliary capacitance lines Cs2 applies the superimposed voltage to both the display pixels PX of the row selected by gate line G1 and the display pixels PX of the row selected by gate line G2, the potential of auxiliary capacitance lines Cs2 after the finish of selection of any of gate lines G1 and G2 is transited from the high voltage state to low voltage state and no conflict occurs therebetween.

This is the same as to the other auxiliary capacitance lines Cs, for example, auxiliary capacitance lines Cs3, Cs4, . . . , and although the superimposed voltage is applied to successive two rows, since the transition of the potential of the auxiliary capacitance lines after the gate line G has been selected is common in any ones of the two rows, no conflict occurs. As explained above, this is because the polarities of the signals supplied to the pixel electrodes PE of the destinations to which they are connected from the respective auxiliary capacitance lines Cs via the auxiliary capacitor Cst are unified.

As described above, a pixel holding voltage amplitude, which is larger than a range (video signal amplitude) of a signal voltage applied from the signal line S to the pixel electrodes PE, can be obtained by applying the superimposed voltage in conformity with the polarities of the display pixels PX. With the operation, the second driver 20 having a small voltage amplitude can be used, thereby a driver cost and power consumption can be reduced.

Next, the 2H1V-CCDI drive will be explained as a different example according to the embodiment using FIG. 11.

Figure 3:
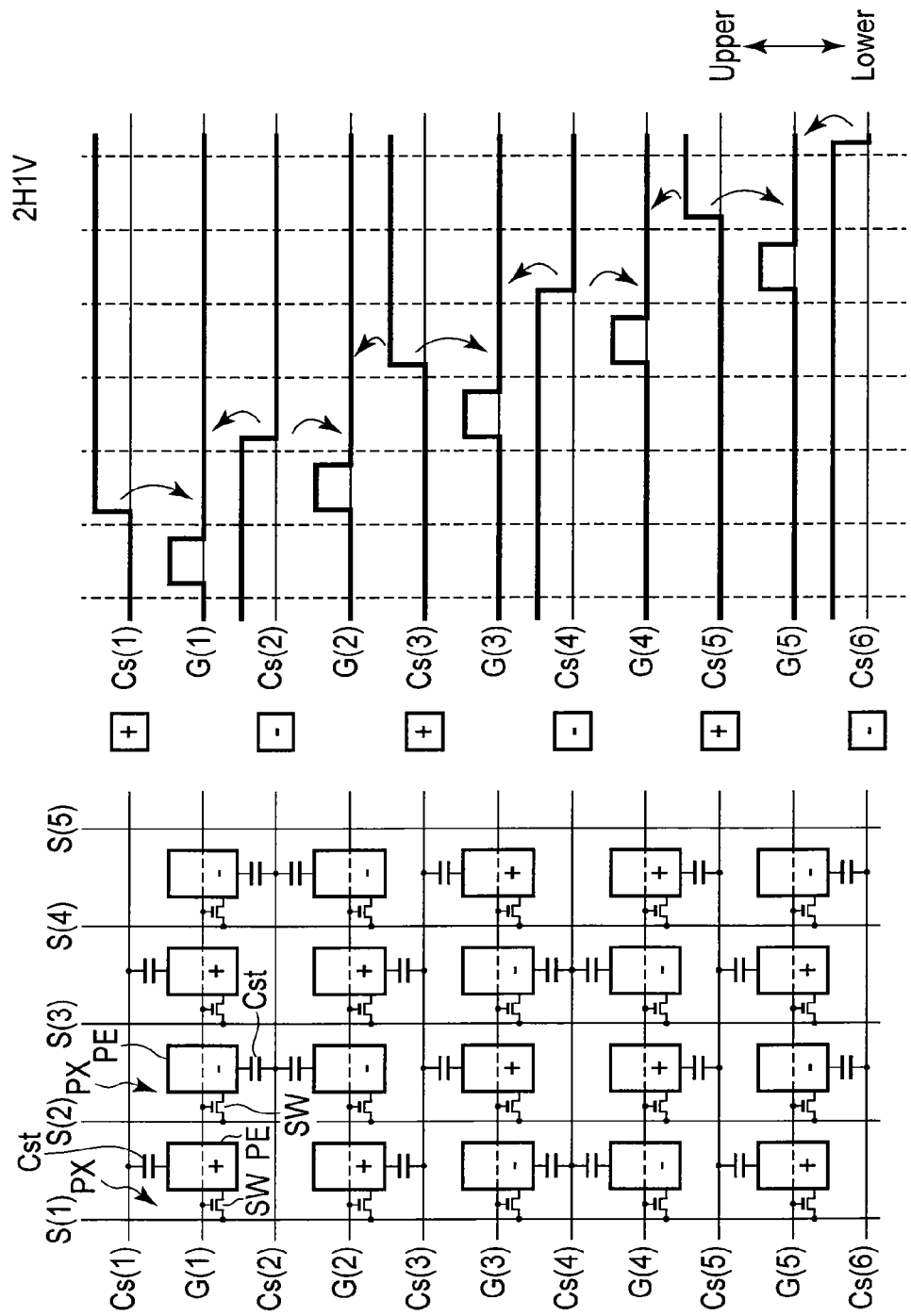
FIG. 3 is a view illustrating a configuration example of an auxiliary capacitance of a pixel in a liquid crystal display apparatus employing a 2H1V-CCDI drive method and an example of a drive waveform.

FIG. 3 is a view illustrating a configuration example of an auxiliary capacitance of a pixel in a liquid crystal display apparatus employing the 2H1V-CCDI drive method and an example of a drive waveform.

The 2H1V-CCDI drive is the same as the 1H1V-CCDI in that the arrangement of pixel polarity is inverted every other column as to a column direction, in the 2H1V-CCDI drive, the arrangement of pixel polarity is inverted every second row.

The 2H1V-CCDI drive is advantageous in that lower power can be realized as compared with the 1H1V-CCDI drive. That is, although the polarity the video signal is inverted every other horizontal period (1H) in the 1H1V inversion, since the polarity of the video signal is inverted every second horizontal period (2H) in the 2H1V inversion, a signal line charge/discharge frequency becomes half that of the 1H1V inversion and thus power consumption is reduced.

In the 2H1V-CCDI drive, to apply a superimposed voltage that is in conformity with the polarity of the respective display pixels PX to the respective display pixels PX, it is sufficient to determine the arrangement of the auxiliary capacitor Cst as described below. First, positive or negative polarity is allocated to the respective auxiliary capacitance lines Cs every other row. For example, positive is allocated to auxiliary capacitance lines Cs1, Cs3, Cs5, . . . , and negative is allocated to auxiliary capacitance lines Cs2, Cs4, Cs6, . . . .

When the polarity is allocated to the auxiliary capacitance lines Cs as described above, ones of the upper and lower auxiliary capacitance lines Cs become positive and the others thereof become negative as to all the display pixels PX. Accordingly, it is sufficient to dispose the auxiliary capacitor Cst between the auxiliary capacitance lines Cs that are in conformity with the polarity of a video signal written to the respective display pixels PX. As a result, the polarity of the superimposed voltage to the pixel electrodes PE connected from, for example, the positive auxiliary capacitance lines Cs via the auxiliary capacitor Cst is entirely made to positive, and the polarity of the superimposed voltage to the pixel electrodes PE connected from the negative auxiliary capacitance lines Cs via the auxiliary capacitor Cst is entirely unified to negative. With the operation, the superimposed voltage can be applied to the respective display pixels PX without conflict of polarity.

As illustrated in FIG. 3, when the 2H1V-CCDI drive is employed, the 2H1V-CCDI drive is different from the 1H1V-CCDI drive in that, in the auxiliary capacitors Cst of the display pixels PX that belong to the respective columns, the auxiliary capacitors Cst which are disposed on an upper side and the auxiliary capacitors Cst which are disposed on a lower side mixedly exist.

Note that since a drive waveform of the 2H1V-CCDI drive is entirely the same as that of the 1H1V-CCDI drive and a specific drive procedure of the 2H1V-CCDI drive is entirely the same as that of the 1H1V-CCDI drive, the explanation thereof is not repeated here.

In the 2H1V-CCDI drive described above, when a polarity inversion cycle of the video signal is more increased, the 2H1V-CCDI drive can be expanded to the nH1V-CCDI drive (n is an integer of 3 or more). When the polarity of the video signal is inverted every nH, there can be obtained a merit that power consumed to charge and discharge a signal line can be reduced in proportion to 1/n. However, when n becomes large, since a lateral stripe and a line flicker that appear at an n-row pitch may become outstanding, it is preferable to select an optimum value of n in view of a specification requested to image quality and power consumption.

Figure 4:
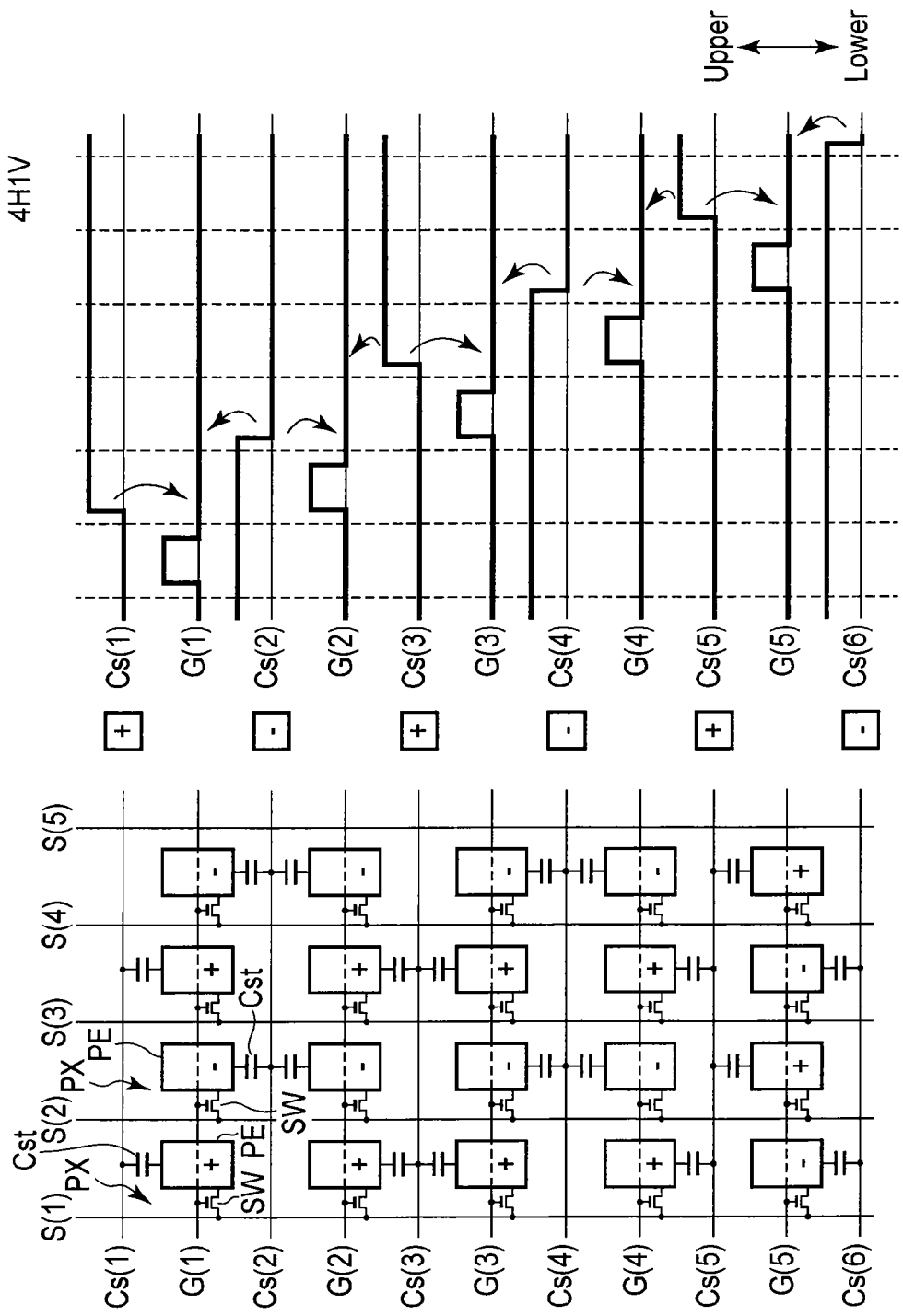
FIG. 4 is a view illustrating a configuration example of an auxiliary capacitance of a pixel in a liquid crystal display apparatus employing a 4H1V-CCDI drive method and an example of a drive waveform.

FIG. 4 is a view illustrating a configuration example of an auxiliary capacitor of a pixel in a liquid crystal display apparatus employing a 4H1V-CCDI drive method and an example of a drive waveform.

In the liquid crystal display apparatus employing the 4H1V-CCDI drive method, a method of determining the arrangement of the auxiliary capacitor Cst is the same as that of the 2H1V-CCDI drive. That is, positive or negative polarity is allocated to the respective auxiliary capacitance lines Cs every other row. For example, the positive polarity is allocated to auxiliary capacitance lines Cs1, Cs3 and Cs5, and the negative polarity is allocated to auxiliary capacitance lines Cs2, Cs4 and Cs6.

When the polarity is allocated to the auxiliary capacitance lines Cs as described above, since ones of the upper and lower auxiliary capacitance lines Cs become positive and the others thereof become negative as to all the display pixels PX, it is sufficient to dispose the auxiliary capacitor Cst between the auxiliary capacitance lines Cs that are in conformity with the polarity of the video signal written to the respective display pixels PX.

Since, for example, the polarity of the superimposed voltage to the pixel electrodes PE connected from the positive auxiliary capacitance lines Cs via the auxiliary capacitor Cst is entirely unified to positive and the polarity of the superimposed voltage to the pixel electrodes PE connected from the negative auxiliary capacitance lines Cs via the auxiliary capacitor Cst is entirely unified to negative, the superimposed voltage can be applied to the respective display pixels PX without conflict of polarity.

FIG. 4 illustrates a configuration example of the auxiliary capacitor Cst of the display pixels PX with the auxiliary capacitor Cst being disposed as described above. Also in the case, it is the same as the 2H1V-CCDI drive that, in the auxiliary capacitors Cst of the display pixels PX that belong to the respective columns, the auxiliary capacitors Cst which are disposed on the upper side and the auxiliary capacitors Cst which are disposed on the lower side mixedly exist.

Since a drive waveform is entirely the same waveform as that of the 1H1V-CCDI drive and the 2H1V-CCDI drive and a specific drive procedure is also entirely the same, the explanation thereof is not repeated here.

Note that, when n is increased and set to a limit n and n is caused to agree with the number of all the lines (number of all the gate lines), the polarity of all the display pixels PX in a row becomes the same, which results in a CC column inversion drive system. Also in the CC column inversion drive system, it is possible to apply the superimposed voltage, which is in conformity with the polarity of the respective display pixels PX, to the respective display pixels PX by determining the arrangement of the auxiliary capacitor Cst by an entirely similar rule. Although the CC column inversion drive system is advantageous in that it consumes a small amount of power and neither a lateral stripe nor a line flicker is generated, longitudinal crosstalk may be generated easily. It is possible to employ the CC column inversion drive system taking the points into consideration. From what has been described above, it is possible to regard that the CC column inversion drive is also included in the CCDI drive in a wide sense.

The liquid crystal display apparatuses of the nH1V-CCDI drive (n is an integer of 1 or more) according to the embodiment have been explained above, a point common to the apparatuses is that the auxiliary capacitors Cst of the display pixels PX disposed on the upper side and the auxiliary capacitors Cst of the display pixels PX disposed on the upper side mixedly exist. A pixel layout in the liquid crystal display apparatuses will be explained below. Note that the case of the 2H1V-CCDI drive will be mainly explained below as an example.

Next, the pixel layout of the liquid crystal display apparatuses will be explained using FIG. 5 to FIG. 7.

FIG. 5 is a view illustrating an example of a pixel layout of a liquid crystal display apparatus of a first embodiment, and a portion corresponding to two pixels (pixel A, pixel B) surrounded by a broken line in a pixel arrangement of FIG. 1 is drawn.

A pixel electrode PE is disposed in a region surrounded by a signal line S and an auxiliary capacitance line Cs and is disposed by being overlapped with parts of the signal line S and the auxiliary capacitance line Cs.

The gate line G is disposed to approximately the central portion of the pixel electrode PE in a direction where the signal line S extends and extends in a direction where the gate line G is approximately orthogonal to the signal line S.

A pixel switch SW extends up to a lower layer of the auxiliary capacitance line Cs so as to intersect the gate line G in a lower layer of the signal line S and has an approximately T-shaped semiconductor layer PS that extends in a direction where the auxiliary capacitance line Cs extends in the lower layer of the auxiliary capacitance line Cs. A portion where the semiconductor layer PS overlaps the auxiliary capacitance line Cs extends up to a left pixel region exceeding a left signal line S. This is to prevent both the semiconductor layers PS from interfering with each other in a portion where it is necessary to form the auxiliary capacitor Cst to a common auxiliary capacitance line Cs as in, for example, pixel B and a pixel thereunder and to prevent an opening rate from being reduced by effectively making use of a region that overlaps the auxiliary capacitance line Cs.

The semiconductor layer PS is electrically connected to the signal line S in a contact hole HL2 disposed to one side of a portion that intersects the gate lines G. The semiconductor layer PS extends to the auxiliary capacitance line Cs side on the other side of a portion that intersects the gate line and is electrically connected to the pixel electrode PE in a contact hole HL1 disposed to a portion where the semiconductor layer PS overlaps the pixel electrodes PE via the contact electrode EC. Note that, in the embodiment, the pixel switch SW may be an amorphous silicon layer having a polysilicon layer as the semiconductor layer PS.

The semiconductor layer PS extends from the lower layer of the signal line S to the auxiliary capacitance line Cs side to which the auxiliary capacitor Cst of a corresponding display pixel PX is connected. The semiconductor layer PS of the pixel switch SW that switches a connection of the pixel electrode PE of pixel A and the signal line S extends from the lower layer of the signal line S to the auxiliary capacitance lines Cs on an upper side and extends in a direction where the auxiliary capacitance line Cs extends in the lower layer of the auxiliary capacitance line Cs on the upper side. The semiconductor layer PS of the pixel switch SW that switches a connection of the pixel electrode PE of pixel B and the signal line S extends from the lower layer of the signal line S to the auxiliary capacitance lines Cs on the lower side and extends in a direction where the auxiliary capacitance line Cs extends in the lower layer of the auxiliary capacitance line Cs on the lower side.

The contact electrode EC is formed in an approximately rectangular shape and a part thereof is disposed inside of pixels A and B with respect to an end side extending approximately parallel to the gate line G of the auxiliary capacitance line Cs.

The auxiliary capacitance line Cs extends approximately parallel to a direction in which the gate line G extends. The auxiliary capacitance line Cs includes a concave portion CsB disposed at the position where contact hole HL1 of an end which extends approximately parallel to the gate line G is disposed and a convex portion CsA that projects inside of pixels A and B from the end which extends approximately parallel to the gate line G. A set of the convex portion CsA and the concave portion CsB is disposed to the auxiliary capacitance line Cs positioned to both the ends in the direction where the signal lines S of respective pixels A and B extend.

Accordingly, openings A1, A2, B1 and B2 of pixels A and B become regions surrounded by the end of the gate line G, the signal line S, and the auxiliary capacitance line Cs including the convex portion CsA and the contact electrode EC.

FIG. 6 is a view illustrating an example of a sectional structure of a liquid crystal display panel taken along line VI-VI in FIG. 5. FIG. 6 illustrates an example of a sectional structure of a boundary portion of two display pixels PX disposed side by side in the direction where the signal line S extends.

As illustrated in FIG. 5 and FIG. 6, the auxiliary capacitor Cst is formed across an insulating layer (insulating film) between an electrode (semiconductor layer electrode) of the semiconductor layer (for example, a polysilicon [p-Si] layer) PS and the auxiliary capacitance lines Cs. A semiconductor layer electrode of the auxiliary capacitor Cst is electrically connected to the pixel electrode PE via the contact electrode EC by contact hole HL1 and has the same potential as that of the pixel electrode PE. Note that contact hole HL1 includes a contact hole HL11 and a contact hole HL12.

The semiconductor layer PS (semiconductor electrode) is disposed on a transparent insulating substrate of an array substrate AR. In a cross section of the array substrate AR, two semiconductor layers PS are disposed side by side in a direction approximately orthogonal to the direction where the auxiliary capacitance line Cs extends.

The auxiliary capacitance line Cs is disposed on an upper layer of the semiconductor layer PS via a gate insulating film L1. The auxiliary capacitance line Cs is disposed so as to overlap a part of the semiconductor layer PS on one hand and the semiconductor layer PS on the other hand in its entirety. That is, the auxiliary capacitance line Cs has the concave portion CsB formed at the position where contact hole HL1 is disposed, and a part of an upper layer of the semiconductor layer PS on the other hand is removed. The contact electrode EC is disposed on an upper layer of the auxiliary capacitance line Cs via an interlayer insulating film L2.

The contact electrode EC is electrically connected to the semiconductor layer PS on the one hand by the gate insulating film L1 on the semiconductor layer PS on the one hand and contact hole HL11 passing through the interlayer insulating film L2 at a position where a conductive layer is removed by the concave portion CsB of the auxiliary capacitance line Cs. The pixel electrode PE is disposed on an upper layer of the contact electrode EC via an organic insulating film L3.

The pixel electrode PE is disposed side by side in a direction approximately orthogonal to the direction where the auxiliary capacitance line Cs extends. Contact hole HL12 that passes through the organic insulating film L3 is disposed in a portion where the pixel electrode PE on the one hand overlaps the contact electrode EC. The pixel electrode PE on the one hand is electrically connected to the contact electrode EC in contact hole HL12.

A not illustrated orientation film is disposed on the pixel electrode PE. A surface of the orientation film is subjected to an orientation process such as a rubbing process, an optical orientation process, and the like in a predetermined direction.

A counter substrate CT has a color filter (not illustrated) and a common electrode CE disposed on the transparent insulating substrate such as a glass, and the like. The common electrode CE is disposed to confront plural pixel electrodes PE. An orientation film (not illustrated) is disposed on the common electrode CE, and a surface thereof is subjected to an orientation process such as a rubbing process, an optical orientation process, and the like in a predetermined direction.

FIG. 7 is a view illustrating a sectional structure of the liquid crystal display panel taken along line VII-VII in FIG. 5. FIG. 7 illustrates an example a sectional structure in line VII-VII approximately parallel to the signal line S at the position where the gate lines G intersects the signal line S.

The semiconductor layer PS is disposed on the transparent insulating substrate of the array substrate AR. The gate line G is disposed on the upper layer of the semiconductor layer PS via the gate insulating film L1. The signal line S is disposed on an upper layer of the gate line G via the interlayer insulating film L2. The organic insulating film L3 is disposed on the signal line S.

Contact hole HL2 is disposed to the gate insulating film L1 and the interlayer insulating film L2 on the end to which the semiconductor layer PS extends. The signal line S is electrically connected to the semiconductor layer PS in contact hole HL2.

The semiconductor layer PS intersects the gate line across the insulating film in a portion corresponding to a longitudinal rod of the T-type semiconductor layer PS, and the pixel switch SW is formed in the portion. A source side of pixel switch SW is electrically connected to the signal line S in contact hole HL2, and a drain side thereof is formed integrally with the semiconductor layer electrode of the auxiliary capacitor Cst. Note that the gate line G functions as a gate electrode of the pixel switch SW.

A configuration of the counter substrate CT is the same as that illustrated in FIG. 6, the explanation thereof is not repeated here.

In the embodiment, openings A1 and B1 on the upper side of the gate line G are disposed approximately in line symmetry with respect to openings A2 and B2 on the lower side of the gate line G to the gate line G in respective pixels A and B by disposing the convex portion CsA to the auxiliary capacitance line Cs as described above.

In other words, in openings A1 and A2 and openings B1 and B2 which are surrounded by the gate line G, the signal line S, the auxiliary capacitance line Cs including the convex portion CsA, and an end of the contact electrode EC and disposed side by side in the direction where the gate line G extends, the positions of centers of gravity of openings A1 and A2 are made the same as those of openings B1 and B2 in the direction where the signal line S extends by disposing the convex portion CsA to the auxiliary capacitance line Cs as described above.

That is, display pixel A includes opening A1 (first opening) on one side of the gate line G in the direction where the signal line S extends and opening A2 (second opening) on the other side of the gate line G.

Opening A1 (first opening) is formed in a concave shape (approximately U-shape) surrounded by the gate line G, the signal line S, the auxiliary capacitance line Cs, and the end of the contact electrode EC. Opening A2 (second opening) is formed in a concave shape (approximately ∩-shape) surrounded by the gate line G, the signal line S, and the end of the auxiliary capacitance line Cs including the convex portion CsA. Opening A1 is disposed approximately in line symmetry with respect to opening A2 in the direction where the gate line G extends.

Likewise, display pixel B includes opening B2 (first opening) on one side of the gate line G in the direction where the signal line S extends and opening B1 (second opening) on the other side of the gate line G.

Opening B2 (first opening) is formed in a concave shape (approximately U-shape) surrounded by the gate line G, the signal line S, the auxiliary capacitance line Cs, and the end of the contact electrode EC. Opening B1 (second opening) is formed in a concave shape (approximately ∩-shape) surrounded by the gate line G, the signal line S, and the end of the auxiliary capacitance line Cs including the convex portion CsA. Opening B2 is disposed approximately in line symmetry with respect opening B1 in the direction where the gate line G extends.

That is, in respective pixels A and B, the contact electrode EC is disposed to a portion where the pixel electrode PE is electrically connected to the semiconductor layer PS, and the contact electrode EC is disposed extending inside of pixels A and B. Accordingly, opening A1 of pixel A and opening B2 of pixel B have portions that are shaded by a part of the contact electrode EC and concaved inside.

In the embodiment, in pixel A, the convex portion CsA of the auxiliary capacitance line Cs on the lower side is disposed extending inside of pixel A so that opening A2 to which the contact electrode EC is not disposed is in line symmetry with respect to opening A1. In pixel B, the convex portion CsA of the auxiliary capacitance line Cs on the upper side is disposed extending inside of pixel B so that opening B1 to which the contact electrode EC is not disposed is in line symmetry with opening B2.

When a case that the convex portion CsA is not disposed to the auxiliary capacitance line Cs is examined, since light is shaded in the portion where the contact electrode EC is disposed, the openings are offset between the upper side and the lower side of pixels A and B.

In pixel A, the pixel electrode PE is electrically connected to the semiconductor layer PS via the contact electrode EC in the concave portion CsB of the auxiliary capacitance line Cs on the upper side. Accordingly, in pixel A, since a shaded portion is formed on an upper end by the contact electrode EC, a dark portion of the upper end becomes large.

In pixel B, the pixel electrodes PE is electrically connected to the semiconductor layer PS via the contact electrode EC in the concave portion CsB of the auxiliary capacitance line Cs on the lower side. Accordingly, in pixel B, since a shaded portion is formed on a lower end by the contact electrode EC, a dark portion of the lower end becomes large.

For example, in a pixel disposed on the lower side of pixel B, the pixel electrode PE is electrically connected to the semiconductor layer PS via the contact electrode EC in the concave portion CsB of the auxiliary capacitance line Cs disposed on the upper side. Accordingly, in the pixel, since a shaded portion is formed on the upper end by the contact electrode EC, a dark portion of the upper end becomes large.

Accordingly, in the vicinity of the auxiliary capacitance line Cs on the lower side of pixel B, a dark portion is generated to a lower end of pixel B on the lower side and a dark portion is generated to an upper end of the pixel on the lower side.

In contrast, in a pixel disposed on the lower side of pixel A, the pixel electrode PE is electrically connected to the semiconductor layer PS via the contact electrode EC in the concave portion CsB of the auxiliary capacitance line Cs disposed on the lower side. Accordingly, in the pixel, since a shaded portion is formed on the lower end by the contact electrode EC, a dark portion of the lower end becomes large.

Accordingly, in the vicinity of the auxiliary capacitance line Cs on the lower side of pixel A, no shaded portion is generated by the contact electrode EC, an opening portion becomes large in comparison with the vicinity of the auxiliary capacitance line Cs on the lower side of pixel B.

In the case, when a halftone solid display (monotone display), a stripe display (1V longitudinal stripe display) of every other row, a dot display of checked pattern (dot-check display) are executed, a bright line and a dark line, which are approximately parallel to the gate line G, are periodically generated, thereby display quality may be lowered.

In contrast, when openings A1 and B1 on the upper side are formed approximately in line symmetry with respect to openings A2 and B2 on the lower side to the gate line G, no offset is caused between the brightness of the upper end of the pixel and the brightness of the lower end of the pixel, thereby display quality is not lowered.

FIG. 8 is a view illustrating an example of a display pattern when a monotone display is executed in the liquid crystal display apparatus employing the 2H1V-CCDI drive system. It is illustrated here that a white pixel shows a bright display (for example, white) and a pixel colored with black shows a dark display (for example, black).

When a minimum unit is extracted as a combination of the disposition of the auxiliary capacitor Cst (whether disposed on an upper side or on a lower side) and a display gradation (whether bright or dark), a portion surrounded by a frame FR1 is obtained as the minimum unit. A display pattern of an overall screen is configured by two-dimensionally repeating the minimum unit. In the monotone display, the minimum unit has a two-row cycle.

Here, attention is paid to the auxiliary capacitance line Cs corresponding to a boundary of display pixels PX which are adjacent to each other above and below and a pattern (portion surrounded by a frame FR2) in the vicinity thereof. When no convex portion CsA is disposed to the auxiliary capacitance line Cs, although a dark portion by the pattern of the contact electrode EC is differently disposed every other row, the number of disposed contact electrodes EC is the same in respective rows. Accordingly, the brightness of the portion surrounded by frame FR2 is approximately the same in the respective rows and no bight/dark pattern is generated at a cycle larger than a pixel pitch.

When the convex portion CsA is disposed to the auxiliary capacitance line Cs, a dark portion by the pattern of the contact electrode EC and the convex portion CsA are disposed likewise in the respective rows, and the number of dark portions is also the same in the respective rows. Accordingly, also in the case, the brightness of the portion surrounded by frame FR2 is approximately the same in the respective rows, and no bight/dark pattern is generated at the cycle larger than the pixel pitch.

Figure 9:
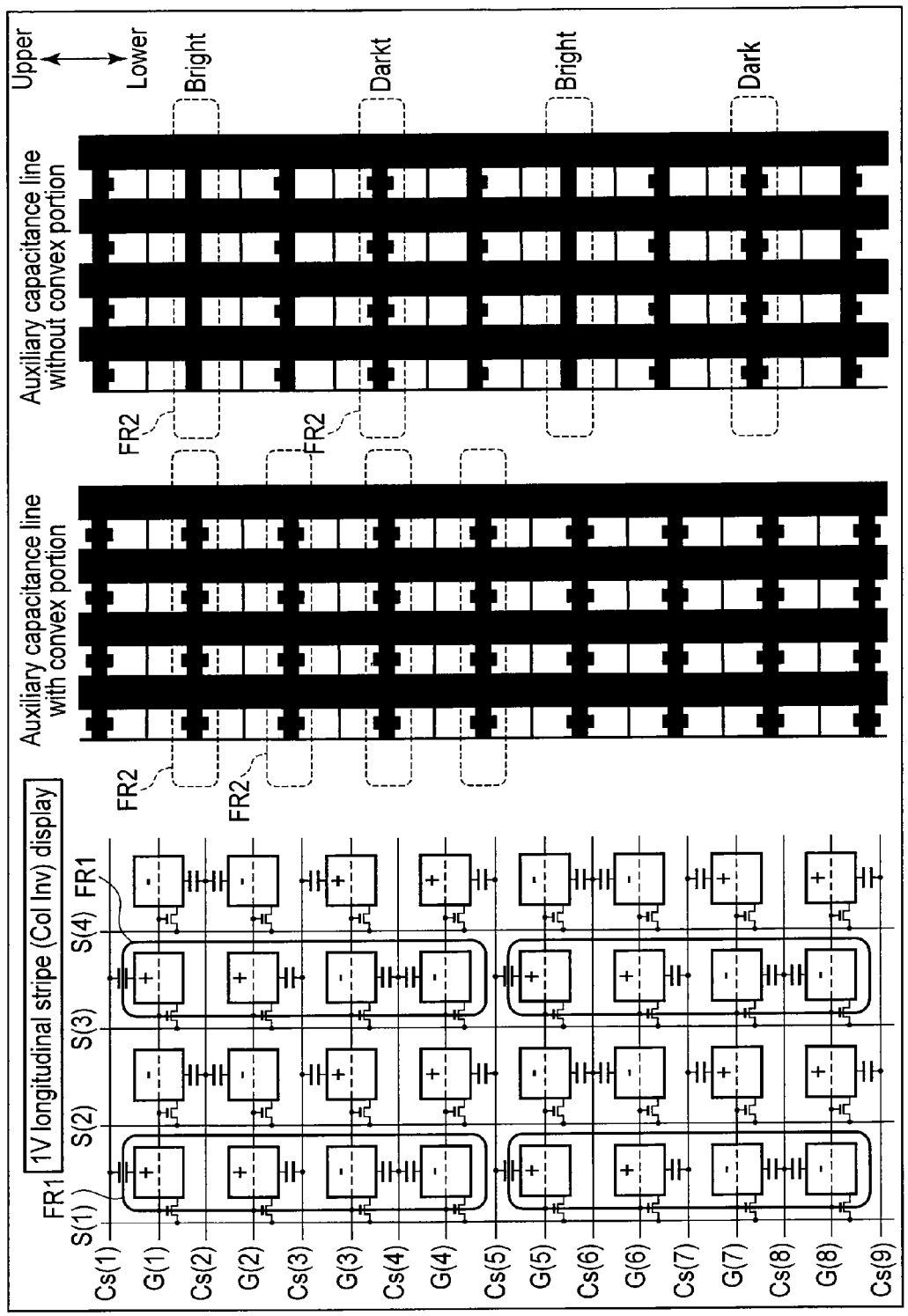
FIG. 9 is a view illustrating an example of a display pattern when a 1V stripe display is executed in the liquid crystal display apparatus employing the 2H1V-CCDI drive system.

FIG. 9 is a view illustrating an example of a display pattern when a 1V stripe is displayed in the liquid crystal display apparatus employing the 2H1V-CCDI drive system. It is illustrated here that a white pixel shows a bright display (for example, white) and a pixel colored with black shows a dark display (for example, black).

Likewise the case of the monotone display, when a minimum unit is extracted as a combination of the disposition of the auxiliary capacitor Cst (whether disposed on an upper side or on a lower side) and a display gradation (whether bright or dark), a portion surrounded by a frame FR1 is obtained as the minimum unit. A display pattern of an overall screen is configured by two-dimensionally repeating the minimum unit. In the 1V longitudinal stripe display, the minimum unit has a four-row cycle.

Here, attention is paid to the auxiliary capacitance line Cs corresponding to a boundary of display pixels PX which are adjacent to each other above and below and a pattern (portion surrounded by a frame FR2) in the vicinity thereof. When no convex portion CsA is disposed to the auxiliary capacitance line Cs, a portion where a dark portion by the pattern of the contact electrode EC does not exist at all and a portion where dark portions by the pattern of the contact electrode EC exists above and below respective columns appear every second column. Since the former portion is recognized relatively bright and the latter portion is recognized relatively dark, when the former and latter portions are visually recognized in broad perspective, they are visually recognized as if bright and dark patterns exist at a four-row cycle.

In contrast, when the convex portion CsA is disposed to the auxiliary capacitance line Cs, a dark portion by the pattern of the contact electrode EC and the convex portion CsA are disposed likewise in the respective rows, and the number of dark portions is also the same in the respective rows. Accordingly, also in the case, the brightness of the portion surrounded by frame FR2 is approximately the same in the respective rows and no bight/dark pattern is generated at a cycle larger than a pixel pitch.

Figure 10:
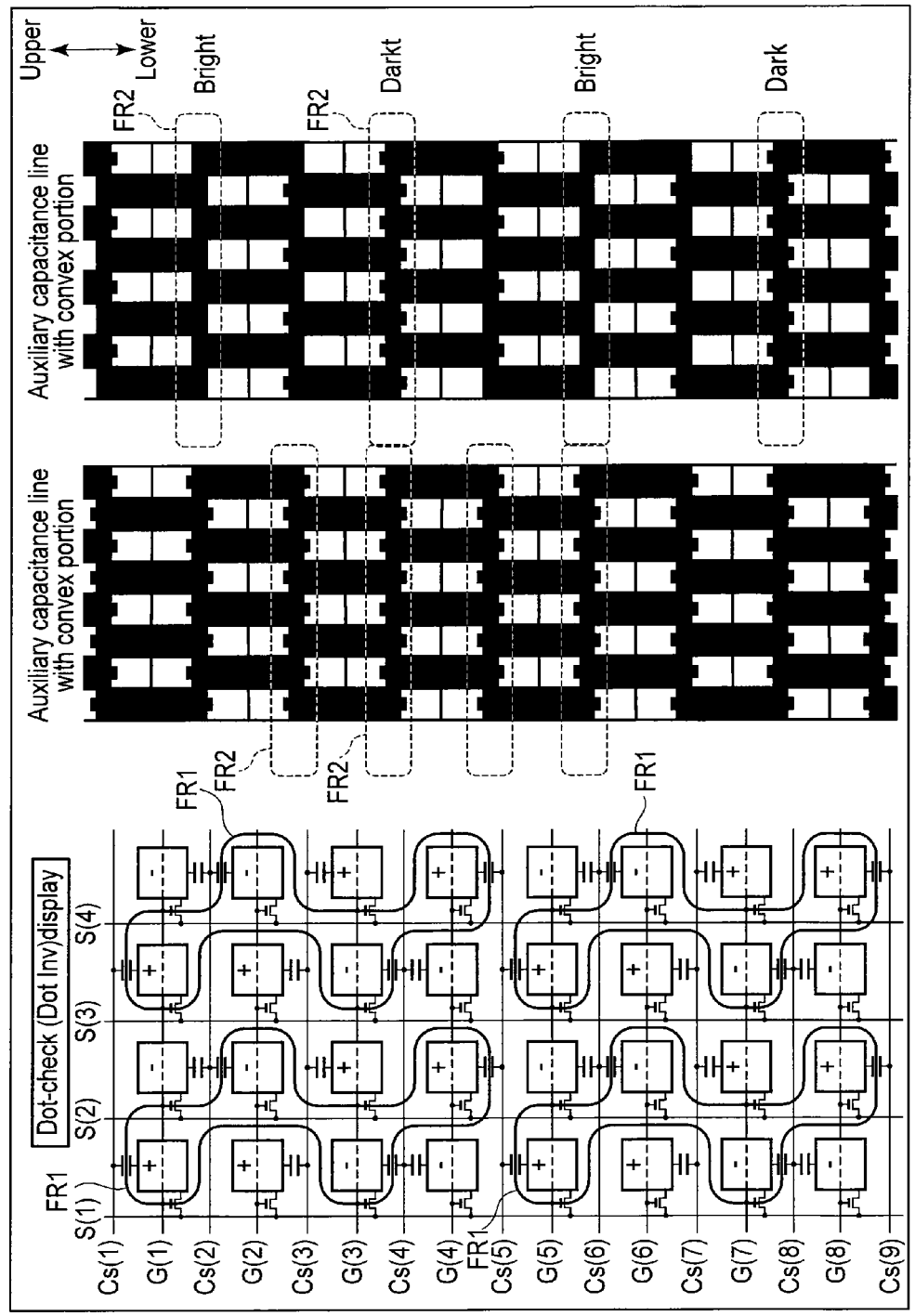
FIG. 10 is a view illustrating an example of a display pattern when a dot-check display is executed in the liquid crystal display apparatus employing the 2H1V-CCDI drive system.

FIG. 10 is a view illustrating an example of a display pattern when a dot-check display is executed in the liquid crystal display apparatus employing the 2H1V-CCDI drive system. It is illustrated here that a white pixel shows a bright display (for example, white) and a pixel colored with black shows a dark display (for example, black).

Likewise the case of the monotone display, when a minimum unit is extracted as a combination of the disposition of the auxiliary capacitor Cst (whether disposed on an upper side or on a lower side) and a display gradation (whether bright or dark), a portion surrounded by a frame FR1 is obtained as the minimum unit. A display pattern of an overall screen is configured by two-dimensionally repeating the minimum unit. In the dot-check display, the minimum unit has a four-row cycle.

Here, attention is paid to the auxiliary capacitance line Cs corresponding to a boundary of display pixels PX which are adjacent to each other above and below and a pattern (portion surrounded by a frame FR2) in the vicinity thereof. When no convex portion CsA is disposed to the auxiliary capacitance line Cs, a portion where a dark portion by the pattern of the contact electrode EC does not exist at all and a portion where a dark portion by the pattern of the contact electrode EC alternately exist above and below appear every second row. Since the former portion is recognized relatively bright and the latter portion is recognized relatively dark, when the former and latter portions are visually recognized in broad perspective, they are visually recognized as if bright and dark patterns exist at a four-row cycle.

In contrast, when the convex portion CsA is disposed to the auxiliary capacitance line Cs, a dark portion by the pattern of the contact electrode EC and the convex portion CsA are disposed likewise in the respective rows, and the number of dark portions is also the same in the respective rows. Accordingly, also in the case, the brightness of the portion surrounded by frame FR2 is approximately the same in the respective rows and no bight/dark pattern is generated at a cycle larger than a pixel pitch.

As described, when the convex portion CsA is disposed to the auxiliary capacitance line Cs, since the display pixel PX forms the convex portion CsA to the auxiliary capacitance line Cs and places the pixel openings in upper and lower symmetry, the shape of openings is made approximately similar regardless that the auxiliary capacitor Cst of the display pixels PX is disposed above or below. Accordingly, the number of convex portions CsA of the auxiliary capacitance line Cs surrounded by frame FR2 is the same in the respective rows, a defective display, in which a bright/dark cycle pattern (lateral stripe) appears at a cycle larger than a pixel pitch, is eliminated, and display quality can be suppressed from being lowered regardless of a display pattern.

That is, according to the embodiment, a liquid crystal display apparatus for suppressing display quality from being lowered can be provided.

Figure 11:
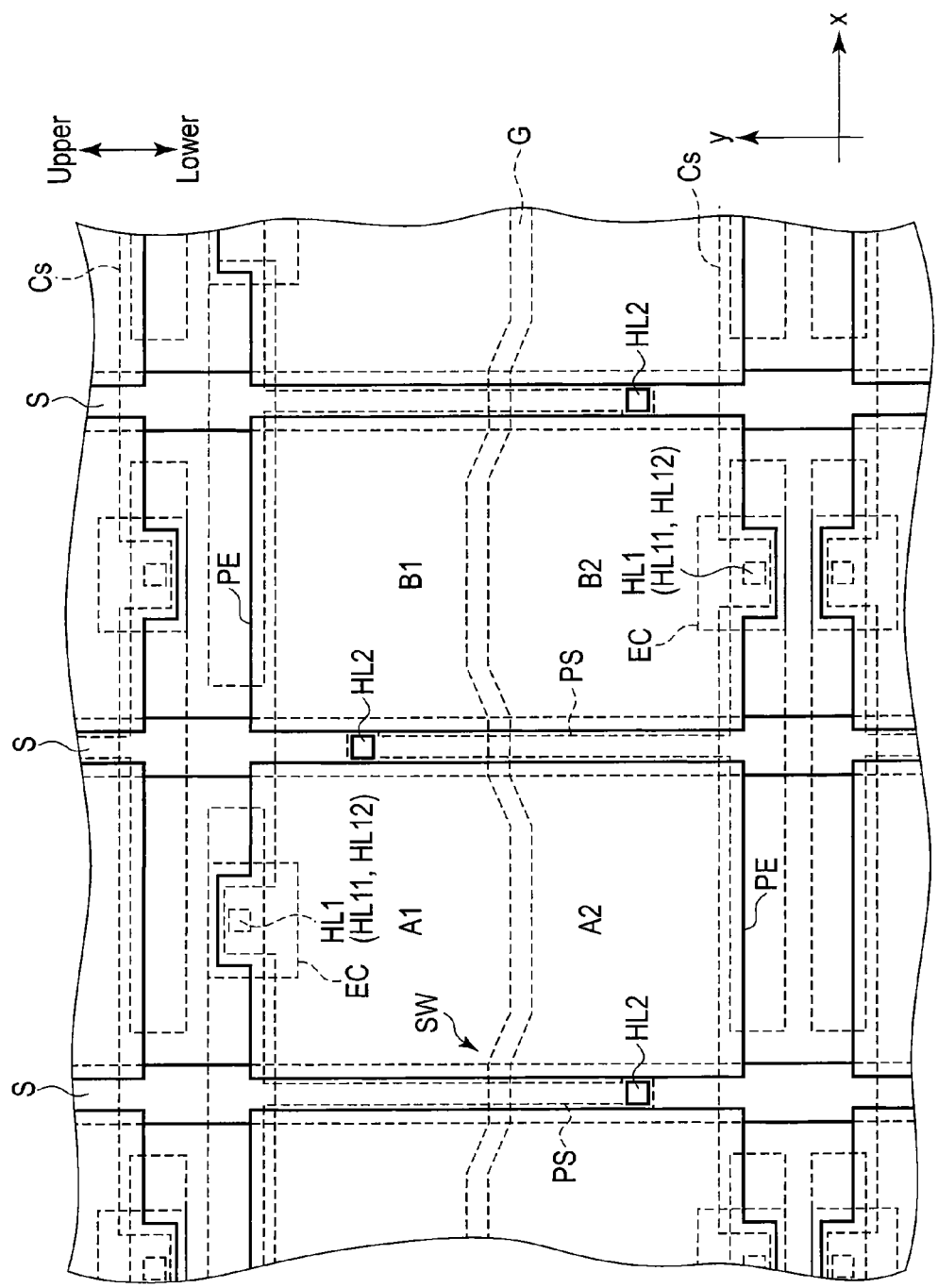
FIG. 11 is a view illustrating an example of a pixel layout of a liquid crystal display apparatus of a second embodiment.

FIG. 11 is a view illustrating an example of a pixel layout of a liquid crystal display apparatus of a second embodiment, and a portion corresponding to the two pixels (pixel A, pixel B) surrounded by the broken line in the pixel arrangement of FIG. 1 is drawn in FIG. 11. Note that, in the following explanation, the same configurations as those of the first embodiment described above are denoted by the same reference numbers and are not explained repeatedly.

In the embodiment, although no convex portion CsA is disposed to an auxiliary capacitance line Cs, in a display pixel PX in which an auxiliary capacitor Cst is connected to an upper auxiliary capacitance line Cs (auxiliary capacitor Cst is connected to an upper side), a gate line G is curved downward and, in a display pixel PX in which an auxiliary capacitor Cst is connected to a lower auxiliary capacitance line Cs (auxiliary capacitor Cst is connected to a lower side), a gate line G is curved upward.

That is, in openings A1 and A2 and openings B1 and B2 which are surrounded by the gate line G, a signal line S, the auxiliary capacitance line Cs including the convex portion CsA, and an end of a contact electrode EC and disposed in the direction where the gate line G extends, the positions of center of gravity of openings A1 and A2 are made the same as those of openings B1 and B2 in the direction where the signal line S extends by curving the gate line G.

Here, the position of center of gravity of the opening of each display pixel PX in an up/down direction (direction approximately parallel to the signal line S) is given by yG of (Expression 1) described below, wherein the direction where the gate line G and the auxiliary capacitance line Cs extend is shown by an x-direction, the direction where the signal line S extends is shown by a y-direction, and the position of center of gravity is shown by a two-dimensional coordinate of (x, y).

$$y_G = \frac{\int_A y\,dxdy}{\int_A dxdy} \qquad \text{[Equation 1]}$$

It is assumed here that a domain of integration A is a pixel opening region (a sum of the area of opening A1 and the area of opening A2 or a sum of the area of opening B1 and the area of opening B2) in (x, y) plane.

Otherwise, to more precisely determine the domain of integration A, it may be determined by (Expression 2) described below by performing weighting by a transmittance distribution T(x, y) of a pixel opening.

$$y_G = \frac{\int_A yT(x,y)\,dxdy}{\int_A T(x,y)\,dxdy} \qquad \text{[Equation 2]}$$

In other words, it is because the position of center of gravity of an opening is different between a display pixel PX having an auxiliary capacitor Cst disposed to an upper side and a display pixel PX having an auxiliary capacitor Cst disposed to a lower side in an up/don direction that a bright/dark pattern is generated at a cycle larger than a pixel pitch in a particular display pattern as described above.

That is, when a display pixel PX having an opening whose center of gravity is offset downward exists on an upper side and a display pixel PX having an opening whose center of gravity is offset upward exists on a lower side using a certain auxiliary capacitance line Cs as a reference, the vicinity of the auxiliary capacitance line Cs is felt relatively bright. Conversely, when a display pixel PX having an opening whose center of gravity is offset upward exists on an upper side and a display pixel PX having an opening whose center of gravity is offset downward exists on a lower side using a certain auxiliary capacitance line Cs as a reference, the vicinity of the auxiliary capacitance line Cs is felt relatively dark.

When a pixel A illustrated in FIG. 11 has a contact electrode EC extending from an upper auxiliary capacitance line Cs downward and the gate line G extending in the x-direction and is formed in an approximately linear shape, an opening A1 of pixel A becomes small. Accordingly, the gate line G is curved downward to prevent the center of gravity of the opening from being offset downward by the influence of the contact electrode EC.

When a pixel B illustrated in FIG. 11 has a contact electrode EC extending from a lower auxiliary capacitance line Cs upward and the gate line G extending in the x-direction and is formed in an approximately linear shape, an opening B2 of pixel B becomes small. Accordingly, the gate line G is curved upward to prevent the center of gravity of the opening from being offset upward by the influence the contact electrode EC.

Since the center of gravity of the opening of pixel A is moved upward and the center of gravity of the opening of pixel B is moved downward by curving the gate line G as described above, the offset of the positions of center of gravity of pixel A and pixel B in the up/down direction can be cancelled. As a result, when displays such as the 1V longitudinal stripe display or the dot-check display and the like are executed, a defective display, in which a lateral stripe is visually recognized at 4-row pitch, is eliminated and display quality can be suppressed from being lowered.

Although the liquid crystal display apparatus employing the 2H1V-CCDI drive has been explained above, other CCDI drives will be also examined.

When A, a monotone display; B, a 1V longitudinal stripe display; and C, a dot-check display are executed, respectively by a liquid crystal display apparatus which has two types of pixels having a different position of center of gravity because a display pixel PX having an auxiliary capacitor Cst disposed to an upper side and a display pixel PX having an auxiliary capacitor Cst disposed to a lower side are mixedly exist therein, at what cycle a lateral stripe is generated will be examined below using FIG. 12 to FIG. 15.

Figure 13:
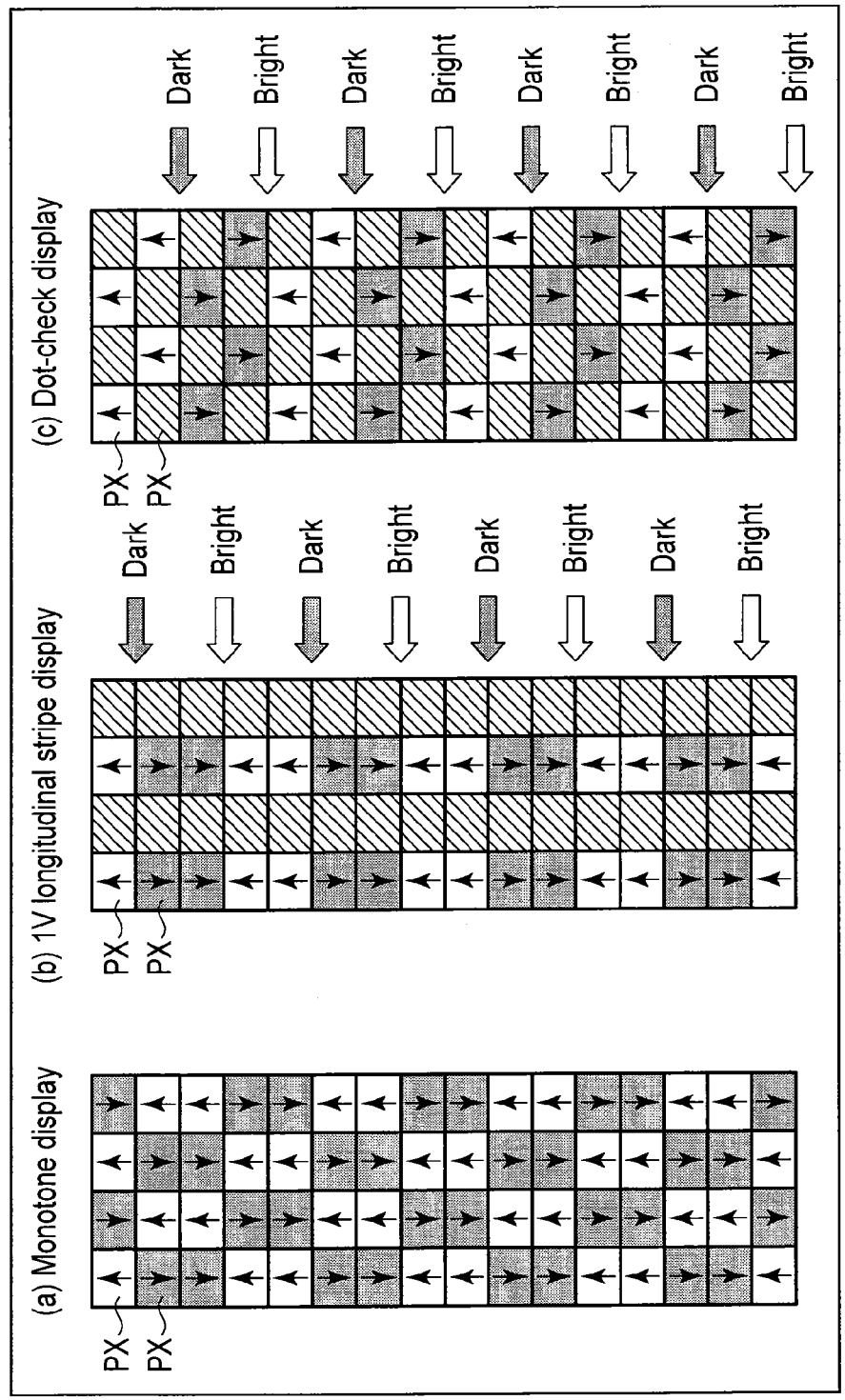
FIG. 13 is a view illustrating an offset of center of gravity of an opening of a pixel as to the respective display patterns in the liquid crystal display apparatus employing the 2H1V-CCDI drive.
Figure 15:
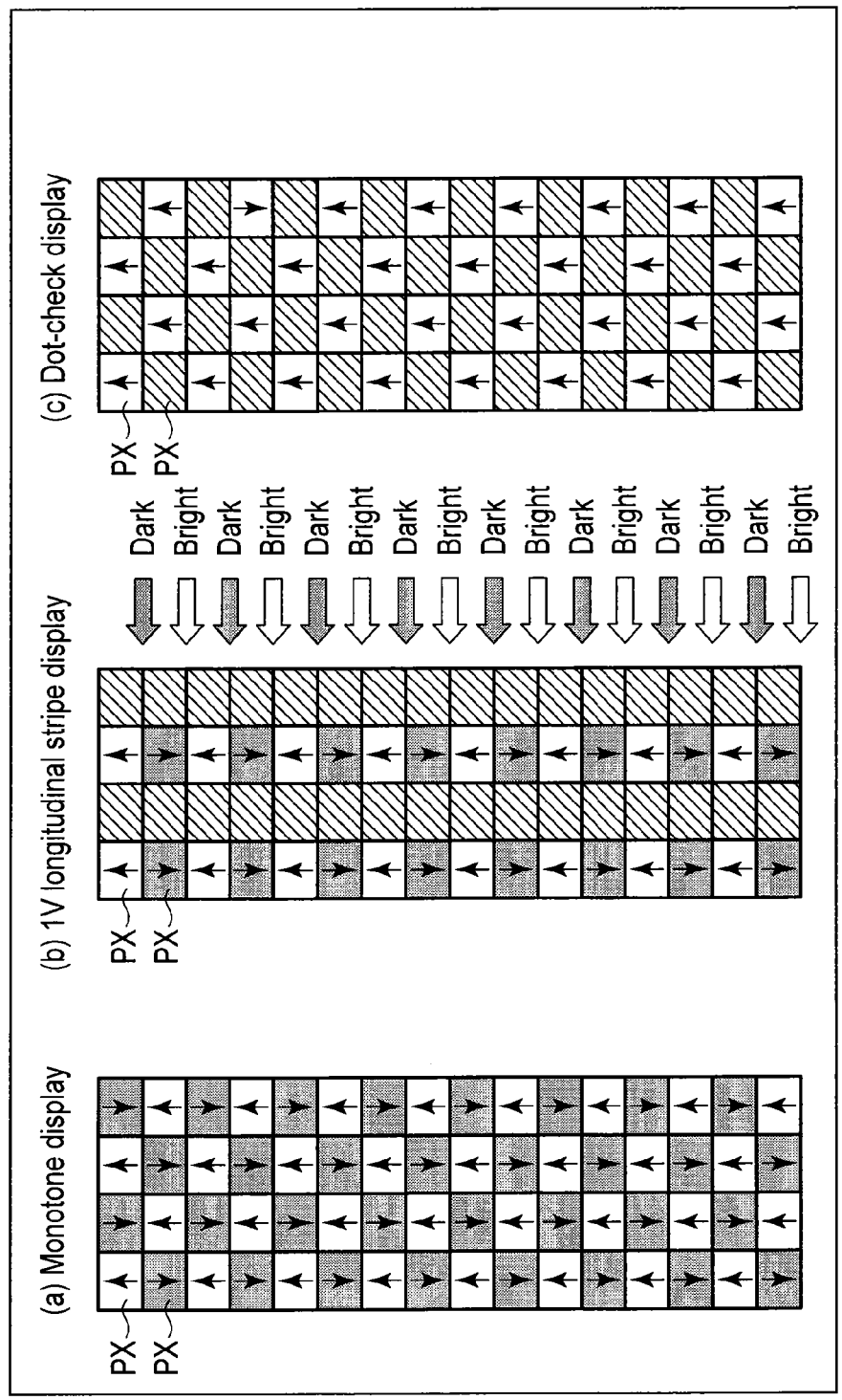
FIG. 15 is a view illustrating an offset of center of gravity of an opening of a pixel as to the respective display patterns in a liquid crystal display apparatus employing a CC column inversion drive.

In FIG. 13 to FIG. 15, ↑ illustrates a display pixel PX having an opening whose center of gravity is offset upward, ↓ illustrates a display pixel PX having an opening whose center of gravity is offset downward, and a hatched portion illustrates a display pixel PX of dark display (for example, black). Further, in the respective display patterns, when attention is paid to a boundary line that corresponds to an upper/lower side of display pixels PX, that is, attention is paid to the vicinity of the auxiliary capacitance line Cs and the positions of center of gravity of the openings of the display pixels PX which execute a bright display in the display pixels PX of the upper and lower rows are located near to the boundary line (that is, when a rate of the display pixels PX the arrows of which face the boundary lines is larger than half), the boundary line is shown as bright. Further, when the positions of center of gravity of the openings of the display pixels PX which execute the bright display in the display pixels PX of the upper and lower rows are not located near to the boundary line (that is, when the rate of the display pixels PX the arrows of which face the boundary lines is smaller than half), the boundary line is shown as dark.

Figure 12:
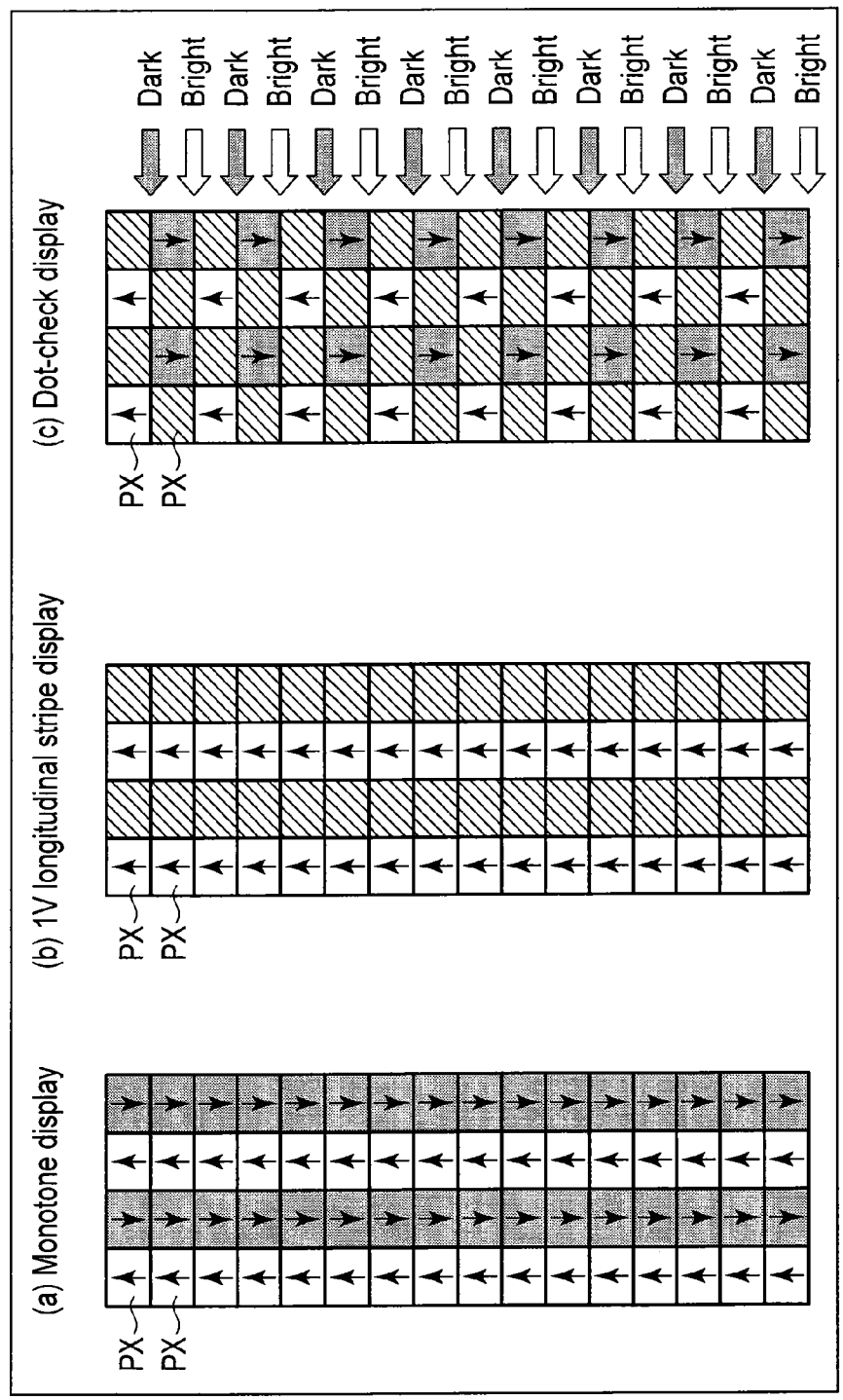
FIG. 12 is a view illustrating an offset of center of gravity of an opening of a pixel as to respective display patterns in the liquid crystal display apparatus employing the 1H1V-CCDI drive.

FIG. 12 is a view illustrating an offset of center of gravity of an opening of a pixel as to the respective display patterns in the liquid crystal display apparatus employing the 1H1V-CCDI drive.

As illustrated in FIG. 12, when the 1H1V-CCDI drive is employed, although no lateral stripe is generated in the monotone display and the 1V longitudinal stripe display, a lateral stripe is generated in the dot-check display every other row.

FIG. 13 is a view illustrating the offset of center of gravity of an opening of a pixel as to the respective display patterns in the liquid crystal display apparatus employing a 2H1V-CCDI drive.

As illustrated in FIG. 13, when the 2H1V-CCDI drive is employed, although no lateral stripe is generated in the monotone display, a lateral stripe is generated in the 1V longitudinal stripe display and the dot-check display every second row.

FIG. 14 is a view illustrating an offset of center of gravity of an opening of a pixel as to the respective display patterns in the liquid crystal display apparatus employing the 4H1V-CCDI drive.

As illustrated in FIG. 14, when the 4H1V-CCDI drive is employed, although no lateral stripe is generated in the monotone display, plural lateral stripes are generated in the 1V longitudinal stripe display at an eight-row cycle, and a lateral stripe is generated in the dot-check display every fourth row.

FIG. 15 is a view illustrating an offset of center of gravity of an opening of a pixel as to the respective display patterns in a liquid crystal display apparatus employing the CC column inversion drive.

As illustrated in FIG. 15, when the CC column inversion drive is employed, although no lateral stripe is generated in the monotone display and the dot-check display, a lateral stripe is generated in the 1V longitudinal stripe display every other row.

In contrast, in the liquid crystal display apparatuses of the first embodiment and the second embodiment, since the center of gravity of the opening of the display pixel PX is not offset, the lateral stripe can be prevented from being generated in any of the drives described above.

That is, according to the embodiments described above, a liquid crystal display apparatus for suppressing display quality from being lowered can be provided.

Note that a larger bright/dark pitch makes it easier to visually recognize the lateral stripe. From the viewpoint, when, in particular, n in the nH1V-CCDI drive is larger than 2, (however, the CC column inversion drive is excluded), since a lateral stripe having a cycle of 4-row or more pitch can be avoided from being generated, it can be said that high image quality improving effect can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The liquid crystal display apparatuses of the embodiments described above do not particularly restrict a liquid crystal mode and can be applied to various modes such as a TN (Twisted Nematic) mode, an OCB (Optically Compensated Bend) mode, a VA (vertically aligned) mode, an IPS (in-plane switching) mode, and an FFS (fringe field switching) mode.

FIG. 16 is a view illustrating other configuration example of an auxiliary capacitor of a pixel in the liquid crystal display apparatus employing the 2H1V-CCDI drive method and other example of the drive waveform.

In the IPS mode and the FFS mode, no common electrode CE is disposed to a counter substrate CT, and a liquid crystal capacitance is formed in parallel with an auxiliary capacitor Cst, that is, between a pixel electrode PE and an auxiliary capacitance line Cs (a common electrode CE disposed to an array substrate AR).

In the case, a drive as illustrated in FIG. 16 may be used in place of the nH1V-CCDI drive illustrated in FIG. 2, FIG. 3, or FIG. 4. Note that a polarity pattern and a drive waveform of a display pixel PX illustrated in FIG. 16 is a case in which the 2H1V-CCDI drive is employed.

In FIG. 2, FIG. 3, and FIG. 4, although the superimposed voltage is applied via the auxiliary capacitance line Cs after a video signal has been written to the display pixel PX, in FIG. 16, a potential of an auxiliary capacitance line Cs is changed before the video signal is written to the display pixel PX.

In a liquid crystal display apparatus in which a common electrode CE that confronts via a liquid crystal layer LQ exists as in the TN mode, the OCB mode, and the like, the common electrode has the same potential in an overall screen. In contrast, in the IPS mode, the FFS mode, and the like, a potential of a common electrode can be changed in each auxiliary capacitance line Cs (or a common electrode CE on an array substrate AR). A drive method illustrated in FIG. 16 intends to write both positive and negative polarities by a small source output amplitude making use of changing the potential of the common electrode described above and can reduce a voltage amplitude or power consumption.

In the liquid crystal display apparatus in which the auxiliary capacitor Cst of the display pixels PX disposed on the upper side and the auxiliary capacitor Cst of the display pixels PX disposed on the lower side mixedly exist, a layout for making the positions of center of gravity of the openings of the two types of the display pixels PX the same can be applied also to the drive as illustrated FIG. 16.

Otherwise, in the liquid crystal display apparatus in which the auxiliary capacitor Cst of the display pixels PX disposed on the upper side and the auxiliary capacitor Cst of the display pixels PX disposed on the lower side mixedly exist, a layout for placing pixel openings in upper and lower symmetry can be applied also to the drive as illustrated FIG. 16.

In any of the cases, when the displays such as the 1V longitudinal stripe display or the dot-check display, and the like are executed, a liquid crystal display apparatus that avoids a defective display in which a lateral stripe is visually recognized and suppresses display quality from being lowered can be provided.

What is claimed is:

1. A liquid crystal display apparatus, comprising:
an array substrate comprising a pixel electrode disposed to each of display pixels disposed in a matrix state, a gate line and an auxiliary capacitance line extending along a row along which the pixel electrode is arranged, a signal line extending along a column along which the pixel electrode is arranged, a semiconductor that intersects the gate line via a first insulating layer and confronts the auxiliary capacitance line, a contact electrode configured to electrically connect the semiconductor to the pixel electrode, and a drive circuit for driving the gate line, the signal line, and the auxiliary capacitance line;
a counter substrate disposed in confrontation with the array substrate; and
a liquid crystal layer sandwiched between the array substrate and the counter substrate,
wherein, in the display pixels disposed side by side in a direction where the gate line extends, the positions of center of gravity of openings of the display pixels, in which the openings of the display pixels include at least the pixel electrode, a second insulating layer which is formed on the first insulating layer, and a third insulating layer which is formed on the second insulating layer within, surrounded by the gate line, the signal line, the auxiliary capacitance line, and ends of the contact electrode are the same in a direction where the signal line extends,
the shapes of the openings are placed in line symmetry with respect to the gate line,
each of the openings comprises a first opening on one side of the gate line in the direction where the signal line extends and a second opening on the other side of the gate line,
the auxiliary capacitance line comprises a convex portion projecting in the direction where the signal line extends,
the first opening is formed in a concave shape surrounded by the gate line, the signal line, the auxiliary capacitance line, and the end of the contact electrode, and
the second opening is formed in a concave shape surrounded by the gate line, the signal line, and an end of the auxiliary capacitance line including the convex portion.

2. The liquid crystal display apparatus according to claim 1, wherein the drive circuit drives a potential of the auxiliary capacitance line in each row.

3. The liquid crystal display apparatus according to claim 2, wherein the drive circuit changes a potential of the auxiliary capacitance line just before a video signal is written to respective pixel electrodes.

4. The liquid crystal display apparatus according to claim 1, wherein when n is an integer of 1 or more, a capacitively-coupled dot inversion drive for inverting polarity every $n^{th}$ row and inverting polarity every other column is employed.

* * * * *